US011252702B2

(12) United States Patent
Tang et al.

(10) Patent No.: US 11,252,702 B2
(45) Date of Patent: Feb. 15, 2022

(54) UPLINK CONTROL INFORMATION SENDING METHOD, UPLINK CONTROL INFORMATION RECEIVING METHOD, AND DEVICE

(71) Applicant: Huawei Technologies Co., Ltd., Guangdong (CN)

(72) Inventors: Hao Tang, Shanghai (CN); Zhongfeng Li, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/369,578

(22) Filed: Mar. 29, 2019

(65) Prior Publication Data

US 2019/0230652 A1 Jul. 25, 2019

Related U.S. Application Data

(63) Continuation of application No. PCT/CN2017/101406, filed on Sep. 12, 2017.

(30) Foreign Application Priority Data

Sep. 30, 2016 (CN) .......................... 201610874921.X

(51) Int. Cl.
*H04W 72/04* (2009.01)
*H04W 72/12* (2009.01)
(Continued)

(52) U.S. Cl.
CPC ....... *H04W 72/0413* (2013.01); *H04L 1/1861* (2013.01); *H04L 1/1896* (2013.01);
(Continued)

(58) Field of Classification Search
CPC . H04W 72/0413; H04W 72/12; H04W 72/04; H04W 72/0453; H04W 72/0446;
(Continued)

(56) References Cited

U.S. PATENT DOCUMENTS

2011/0205981 A1* 8/2011 Koo ................. H04W 72/1284
370/329
2014/0016546 A1* 1/2014 Jang ..................... H04B 7/0456
370/328
(Continued)

FOREIGN PATENT DOCUMENTS

CN 103427940 A 12/2013
CN 103476120 A 12/2013
(Continued)

OTHER PUBLICATIONS

Levanen, T.A. et al., "Radio Interface Evolution Towards 5G and Enhanced Local Area Communications", IEEE Access, Special Section on 5G Wireless Technologies: Perspectives of the Next Generation Mobile Communications and Networking, vol. 2, Sep. 19, 2014, pp. 1005-1029.
(Continued)

*Primary Examiner* — Peter P Chau
(74) *Attorney, Agent, or Firm* — Slater Matsil, LLP

(57) ABSTRACT

A method for sending uplink control information, a method for receiving uplink control information, and a device are provided. The method for sending uplink control information includes: obtaining, by user equipment, uplink control information; and mapping, by the user equipment, the uplink control information to at least two transmission time units, to send the uplink control information to a network device.

12 Claims, 8 Drawing Sheets

(51) Int. Cl.
*H04L 1/18* (2006.01)
*H04L 5/00* (2006.01)

(52) U.S. Cl.
CPC ............... *H04L 5/00* (2013.01); *H04W 72/04* (2013.01); *H04W 72/0446* (2013.01); *H04W 72/0453* (2013.01); *H04W 72/12* (2013.01); *H04W 72/1268* (2013.01)

(58) Field of Classification Search
CPC ......... H04W 72/1268; H04W 72/0493; H04W 72/1284; H04L 1/1861; H04L 1/1896; H04L 5/00
See application file for complete search history.

(56) References Cited

U.S. PATENT DOCUMENTS

| | | | |
|---|---|---|---|
| 2014/0092793 A1 | 4/2014 | Yang et al. | |
| 2014/0286255 A1 | 9/2014 | Nam et al. | |
| 2016/0056942 A1* | 2/2016 | Wang | H04L 5/0048 370/330 |
| 2016/0100398 A1* | 4/2016 | Xia | H04W 72/0413 370/330 |
| 2016/0143032 A1 | 5/2016 | Horiuchi | |
| 2017/0347353 A1* | 11/2017 | Yerramalli | H04L 1/0031 |
| 2018/0092089 A1* | 3/2018 | Yin | H04W 72/1278 |
| 2018/0375619 A1* | 12/2018 | Hwang | H04W 72/0446 |
| 2019/0007248 A1* | 1/2019 | Takeda | H04W 72/12 |
| 2019/0123881 A1* | 4/2019 | Lee | H04W 72/0413 |

FOREIGN PATENT DOCUMENTS

| | | |
|---|---|---|
| CN | 104144509 A | 11/2014 |
| CN | 105245312 A | 1/2016 |
| EP | 2822207 A1 | 1/2015 |
| WO | 2016117929 A1 | 7/2016 |

OTHER PUBLICATIONS

Levanen, T.A. et al., "Dense Small-Cell Networks: Rethinking the Radio Interface Beyond LTE-Advanced", 1st International Conference on 5G for Ubiquitous Connectivity (5GU), Akaslompolo, Finland, Nov. 26-28, 2014, pp. 163-169.

* cited by examiner

UPLINK CONTROL INFORMATION SENDING METHOD, UPLINK CONTROL INFORMATION RECEIVING METHOD, AND DEVICE

CROSS-REFERENCE TO RELATED APPLICATIONS

This application is a continuation of International Application No. PCT/CN2017/101406 filed on Sep. 12, 2017, which claims priority to Chinese Patent Application No. 201610874921.X filed on Sep. 30, 2016. The disclosures of the aforementioned applications are hereby incorporated by reference in their entireties.

TECHNICAL FIELD

The present application relates to the field of communications technologies, and in particular, to an uplink control information sending method, an uplink control information receiving method, and a device.

BACKGROUND

In a future 5th generation mobile telecommunications system (5G), to fast transmit and fast control an information feedback, a new subframe type, namely, a self-contained subframe, may be introduced. The self-contained subframe may include a first type of subframe and/or a second type of subframe. In the following, the first type of subframe is referred to as a subframe S1, and the second type of subframe is referred to as a subframe S2. Both the subframe S1 and the subframe S2 include a symbol used for downlink transmission, a guard period (GP), and a symbol used for uplink transmission.

The symbol that is in the subframe S1 and that is used for downlink transmission is mainly used to transmit downlink control information and downlink data, and the symbol that is in the subframe S1 and that is used for uplink transmission is mainly used to transmit uplink control information (UCI) and a sounding reference signal (SRS). Currently, in the subframe S1, a quantity of symbols used for downlink transmission, a quantity of symbols occupied by the GP, and a quantity of symbols used for uplink transmission have not been determined, but it is basically determined that the quantity of symbols used for uplink transmission is not large. For example, if the subframe S1 includes 14 symbols in total, there may be one or two symbols used for uplink transmission.

In an existing Long Term Evolution (LTE) system, a physical uplink control channel (PUCCH) needs to occupy 14 symbols in time domain. In other words, in one subframe, 14 symbols may be used to transmit UCI. However, it can be learned based on the foregoing description that, a quantity of symbols in the subframe S1 that are used to transmit UCI is relatively small. Therefore, compared with the LTE, coverage of the subframe S1 for the PUCCH is relatively poor. It is very likely that some uplink control information fails to be transmitted.

SUMMARY

Embodiments of the present application provide an uplink control information sending method, an uplink control information receiving method, and a device, to improve coverage, for a PUCCH, of a subframe in a 5G system.

According to a first aspect, an uplink control information sending method is provided, where the method is executed by user equipment. The method includes: obtaining, by the user equipment, uplink control information; and mapping, by the user equipment, the uplink control information to at least two transmission time units, to send the uplink control information to a network device.

In this embodiment of the present application, the user equipment may map the uplink control information to the at least two transmission time units, to send the uplink control information. In this way, the uplink control information may occupy a relatively large quantity of symbols, coverage for a PUCCH is improved, and especially, when a relatively large amount of uplink control information needs to be transmitted, a situation in which the uplink control information fails to be transmitted due to a lack of resources can be effectively avoided.

With reference to the first aspect, in a first possible implementation of the first aspect, the mapping, by the user equipment, the uplink control information to at least two transmission time units, to send the uplink control information to a network device may be implemented in the following manner: mapping, by the user equipment, partial information of the uplink control information to last M symbols in a first transmission time unit, and mapping remaining information of the uplink control information to first N symbols in a second transmission time unit, so as to send the uplink control information to the network device. The first transmission time unit and the second transmission time unit are contiguous transmission time units, and both M and N are positive integers.

The user equipment separately maps the uplink control information to the first transmission time unit and the second transmission time unit. Therefore, the uplink control information may occupy uplink symbols in the two transmission time units, so that a relatively large quantity of symbols can be occupied. In this way, the uplink control information can be fully transmitted, and a situation in which the uplink control information fails to be transmitted due to a limited uplink transmission resource is avoided as far as possible. Further, the first transmission time unit and the second transmission time unit are contiguous transmission time units, and the user equipment maps the partial information of the uplink control information to the last M symbols in the first transmission time unit, and maps the remaining information of the uplink control information to the first N symbols in the second transmission time unit, to ensure, as far as possible, that the uplink control information can be continuously transmitted, thereby improving data transmission quality.

With reference to the first possible implementation of the first aspect, in a second possible implementation of the first aspect, because the user equipment needs to send the partial information of the uplink control information in the first transmission time unit, a frequency domain position occupied by the partial information of the uplink control information in the first transmission time unit needs to be learned of. The user equipment determines the frequency domain position of the partial information of the uplink control information in the first transmission time unit in, but not limited to, the following two manners: The user equipment further receives control signaling sent by the network device, and determines the frequency domain position of the partial information of the uplink control information in the first transmission time unit based on the control signaling; or the user equipment determines downlink control information corresponding to received downlink data, and obtains the frequency domain position of the partial information in the first transmission time unit through calculation based on a number of the first control channel element of the downlink control information.

In other words, the frequency domain position of the partial information of the uplink control information in the first transmission time unit may be notified by the network device to the user equipment, or may be calculated by the user equipment. The manners are relatively flexible. The frequency domain position of the partial information of the uplink control information in the first transmission time unit may be determined by selecting different manners depending on an actual situation.

With reference to the first possible implementation or the second possible implementation of the first aspect, in a third possible implementation of the first aspect, because the user equipment needs to send the remaining information of the uplink control information in the second transmission time unit, a frequency domain position occupied by the remaining information of the uplink control information in the second transmission time unit needs to be learned of. The frequency domain position occupied by the uplink control information in the second transmission time unit is the same as the frequency domain position occupied by the uplink control information in the first transmission time unit; or there is a first offset between the frequency domain position occupied by the uplink control information in the second transmission time unit and the frequency domain position occupied by the uplink control information in the first transmission time unit.

In this embodiment of the present application, the frequency domain position occupied by the uplink control information in the second transmission time unit may be different, and may be set depending on a system status. The frequency domain position occupied by the uplink control information in the second transmission time unit may be notified by the network device to the user equipment, for example, may be notified by the network device to the user equipment along with the control signaling; or may be calculated by the user equipment. The manners are relatively flexible. Therefore, if there is the first offset between the frequency domain position occupied by the uplink control information in the second transmission time unit and the frequency domain position occupied by the uplink control information in the first transmission time unit, the first offset may be sent by the network device to the user equipment, or may be pre-defined in a protocol or a standard. This is not limited in this embodiment of the present application.

With reference to the first possible implementation or the second possible implementation of the first aspect, in a fourth possible implementation of the first aspect, a frequency domain position occupied by the uplink control information in the second transmission time unit is P contiguous subcarriers. The P subcarriers include a subcarrier that has a smallest number and that is in an uplink time-frequency resource allocated to the user equipment in the second transmission time unit, or the P subcarriers include a subcarrier that has a largest number and that is in an uplink time-frequency resource allocated to the user equipment in the second transmission time unit, and P is a positive integer.

In other words, the remaining information of the uplink control information may occupy the P contiguous subcarriers in the second transmission time unit, to implement continuous sending. In addition, the remaining information of the uplink control information is distributed on a frequency domain edge in the second transmission time unit as far as possible, to ensure, as far as possible, that central frequency domain positions in the second transmission time unit are contiguous. In this implementation, whether the P subcarriers carry uplink data is not limited. In other words, the remaining information of the uplink control information may be sent along with uplink data that needs to be transmitted in the second transmission time unit, to improve a resource reuse rate.

With reference to the first aspect, in a fifth possible implementation of the first aspect, the mapping, by the user equipment, the uplink control information to at least two transmission time units, to send the uplink control information to a network device may be implemented in the following manner: repeatedly mapping, by the user equipment, the uplink control information to the at least two transmission time units, to send at least two pieces of uplink control information to the network device. The at least two transmission time units are contiguous transmission time units, or the at least two transmission time units are non-contiguous transmission time units.

In this implementation, this is equivalent to the following: The user equipment repeatedly sends the uplink control information to the network device, and the network device should receive at least two pieces of uplink control information. Especially for user equipment that has relatively poor coverage or relatively poor network quality, such a manner of repeated sending may be used to ensure, as far as possible, that the network device can successfully receive the uplink control information, so that a success rate of sending the uplink control information is improved.

With reference to any one of the first aspect, or the first to the fifth possible implementations of the first aspect, in a sixth possible implementation of the first aspect, the transmission time unit includes one or more subframes, or the transmission time unit includes one or more slots, or the transmission time unit includes one or more symbols.

In this embodiment of the present application, the transmission time unit may be a conventional subframe, or a transmission gap that is used in a 5G system or a next generation communications system, or may have another meaning.

With reference to any one of the first aspect, or the first to the sixth possible implementations of the first aspect, in a seventh possible implementation of the first aspect, the uplink control information includes an acknowledgement/a negative acknowledgement used for a hybrid automatic repeat request, and/or channel state information.

The uplink control information in this embodiment of the present application may include conventional uplink control information, for example, an ACK/NACK in a HARQ technology, and CSI. Specific content included in the uplink control information is not limited in this embodiment of the present application, and reference may be made to content included in uplink control information in the prior art. The uplink control information further includes possible control information in an uplink direction in a future communications system.

According to a second aspect, an uplink control information receiving method is provided, where the method is executed by a network device. The method includes: sending, by the network device, control signaling to user equipment, where the control signaling is used to instruct the user equipment to map uplink control information to at least two transmission time units to send the uplink control information to the network device; and receiving, by the network device in the at least two transmission time units, the uplink control information sent by the user equipment.

In this embodiment of the present application, the network device may instruct the user equipment to map the uplink control information to the at least two transmission time units to send the uplink control information. In this way, the uplink control information may occupy a relatively large quantity of symbols, coverage for a PUCCH is improved, and especially, when a relatively large amount of uplink control information needs to be transmitted, a situation in which the uplink control information fails to be transmitted due to a lack of resources can be effectively avoided.

With reference to the second aspect, in a first possible implementation of the second aspect, the control signaling further instructs the user equipment to map partial information of the uplink control information to last M symbols in a first transmission time unit, and map remaining information of the uplink control information to first N symbols in a second transmission time unit. The first transmission time unit and the second transmission time unit are contiguous transmission time units, and both M and N are positive integers. In this case, the receiving, by the network device in the at least two transmission time units, the uplink control information sent by the user equipment is implemented in the following manner: receiving, by the network device, the partial information of the uplink control information on the last M symbols in the first transmission time unit, and receiving the remaining information of the uplink control information on the first N symbols in the second transmission time.

The network device instructs the user equipment to send the uplink control information in the two transmission time units, so that the uplink control information may occupy uplink symbols in the two transmission time units, and therefore the uplink control information may occupy a relatively large quantity of uplink symbols. This improves coverage for an uplink resource. In addition, the user equipment implements continuous mapping of the uplink control information by using the two contiguous transmission time units, and the network device can also implement continuous reception, so that data sending quality and data reception quality are improved.

With reference to the first possible implementation of the second aspect, in a second possible implementation of the second aspect, the control signaling further indicates a frequency domain position of the partial information of the uplink control information in the first transmission time unit; or the control signaling further instructs the user equipment to calculate a frequency domain position of the partial information of the uplink control information in the first transmission time unit based on a number of the first control channel element of downlink control information corresponding to received downlink data.

The network device may directly inform, by using the control signaling, the user equipment of the frequency domain position of the partial information of the uplink control information in the first transmission time unit. After receiving the control signaling, the user equipment may directly obtain the frequency domain position of the partial information of the uplink control information in the first transmission time unit. The manner is relatively simple. Alternatively, the network device may instruct the user equipment to calculate the frequency domain position of the partial information of the uplink control information in the first transmission time unit. In this case, the user equipment may obtain, through calculation, the frequency domain position of the partial information of the uplink control information in the first transmission time unit, so that a data amount of the control signaling is reduced, and a transmission resource is saved. Certainly, a case in which the network device informs the user equipment of the frequency domain position of the partial information of the uplink control information in the first transmission time unit is described herein, and in another implementation, the user equipment may alternatively obtain the frequency domain position of the partial information of the uplink control information in the first transmission time unit based on a pre-definition in a protocol or a standard. This is not limited in this embodiment of the present application.

With reference to the first possible implementation or the second possible implementation of the second aspect, in a third possible implementation of the second aspect, the control signaling further indicates that a frequency domain position occupied by the uplink control information in the second transmission time unit is the same as the frequency domain position occupied by the uplink control information in the first transmission time unit; or the control signaling further indicates that there is a first offset between a frequency domain position occupied by the uplink control information in the second transmission time unit and the frequency domain position occupied by the uplink control information in the first transmission time unit.

The network device can not only indicate the frequency domain position of the partial information of the uplink control information in the first transmission time unit, but also inform the user equipment of the frequency domain position of the remaining information of the uplink control information in the second transmission time unit. The frequency domain position of the partial information of the uplink control information in the first transmission time unit may be the same as the frequency domain position of the remaining information of the uplink control information in the second transmission time unit. In this case, the network device merely needs to directly inform the user equipment of the frequency domain position of the remaining information of the uplink control information in the second transmission time unit. Alternatively, there may be the first offset between the frequency domain position of the partial information of the uplink control information in the first transmission time unit and the frequency domain position of the remaining information of the uplink control information in the second transmission time unit. In this case, the user equipment can obtain the frequency domain position of the remaining information of the uplink control information in the second transmission time unit provided that the user equipment obtains the frequency domain position of the partial information of the uplink control information in the first transmission time unit and the first offset. The first offset may be sent by the network device to the user equipment along with the control signaling, or may be pre-defined in a protocol or a standard. In addition, in another implementation, the user equipment may alternatively determine, based on a pre-definition in a protocol or a standard, whether the frequency domain position of the remaining information of the uplink control information in the second transmission time unit is the same as the frequency domain position of the partial information of the uplink control information in the first transmission time unit or there is the first offset between the frequency domain position of the remaining information of the uplink control information in the second transmission time unit and the frequency domain position of the partial information of the uplink control information in the first transmission time unit; and the first offset may be sent by the network device to the user equipment, or may be obtained by the user equipment based on a pre-definition in a protocol or a standard. In other words, there are a relatively large quantity of manners for the user equipment to obtain the frequency domain position of the remaining information of the uplink control information in the second transmission time unit, and different manners may be selected depending on a situation.

With reference to the first possible implementation or the second possible implementation of the second aspect, in a fourth possible implementation of the second aspect, the control signaling further indicates that a frequency domain position occupied by the uplink control information in the second transmission time unit is P contiguous subcarriers. The P subcarriers include a subcarrier that has a smallest number and that is in an uplink time-frequency resource allocated to the user equipment in the second transmission time unit, or the P subcarriers include a subcarrier that has a largest number and that is in an uplink time-frequency resource allocated to the user equipment in the second transmission time unit, and P is a positive integer.

In other words, the remaining information of the uplink control information occupies contiguous frequency domain positions in the second transmission time unit as far as possible, so that continuous mapping is performed, and sending quality is improved. Further, the remaining information of the uplink control information occupies a frequency domain edge in the second transmission time unit as far as possible, so that central frequency domain positions in the second transmission time unit are contiguous as far as possible.

With reference to the second aspect, in a fifth possible implementation of the second aspect, the receiving, by the network device in the at least two transmission time units, the uplink control information sent by the user equipment includes: receiving, by the network device, at least two pieces of uplink control information in the at least two transmission time units. The at least two transmission time units are contiguous transmission time units, or the at least two transmission time units are non-contiguous transmission time units.

In this implementation, the user equipment repeatedly sends the uplink control information to the network device. In this case, the network device may receive at least two pieces of uplink control information, so that a sending success rate and a reception success rate of the uplink control information are improved. Especially for user equipment that has relatively poor coverage or relatively poor network quality, by using such a manner of repeated sending, the network device can receive the uplink control information as far as possible, thereby preventing the uplink control information from being lost.

With reference to any one of the second aspect, or the first to the fifth possible implementations of the second aspect, in a sixth possible implementation of the second aspect, the transmission time unit includes one or more subframes, or the transmission time unit includes one or more slots, or the transmission time unit includes one or more symbols.

With reference to any one of the second aspect, or the first to the sixth possible implementations of the second aspect, in a seventh possible implementation of the second aspect, the uplink control information includes an acknowledgement/a negative acknowledgement used for a hybrid automatic repeat request, and/or channel state information.

According to a third aspect, an uplink control information sending method is provided, where the method is executed by user equipment. The method includes: obtaining, by the user equipment, uplink control information; and sending, by the user equipment, the uplink control information to a network device in a first transmission time unit. The user equipment maps the uplink control information to all or some symbols in a symbol set included in the first transmission time unit. The symbol set includes last M symbols in the first transmission time unit, where M is a positive integer.

A transmission time unit may include a plurality of symbols used to transmit uplink control information. The symbol set includes, for example, symbols that are in the first transmission time unit and that are used to transmit uplink control information. Therefore, when sending the uplink control information, the user equipment may map the uplink control information to all the symbols in the symbol set, so that relatively abundant uplink transmission resources are available for the uplink control information; or map the uplink control information to some symbols in the symbol set. The manners are relatively flexible.

With reference to the third aspect, in a first possible implementation of the third aspect, if the user equipment maps the uplink control information to some symbols in the symbol set included in the first transmission time unit, the user equipment may further send a reference signal to the network device on a symbol that is in the symbol set and to which the uplink control information is not mapped.

In other words, the user equipment uses only some symbols in the symbol set to map the uplink control information; to improve transmission resource utilization, other information such as a reference signal for the network device may be mapped to the symbol that is in the symbol set and to which the uplink control information is not mapped. In this way, as much information as possible can be sent to the network device by using limited transmission resources.

According to a fourth aspect, an uplink control information receiving method is provided, where the method is executed by a network device. The method includes: sending, by the network device, control signaling to user equipment, where the control signaling is used to: instruct the user equipment to map uplink control information to all or some symbols in a symbol set included in a first transmission time unit, to send the uplink control information to the network device. The symbol set includes last M symbols in the first transmission time unit, where M is a positive integer. In this case, if the control signaling is used to instruct the user equipment to map the uplink control information to all the symbols in the symbol set to send the uplink control information to the network device, the network device receives the uplink control information on all the symbols in the symbol set; or if the control signaling is used to instruct the user equipment to map the uplink control information to some symbols in the symbol set to send the uplink control information to the network device, the network device receives the uplink control information on the some symbols in the symbol set.

A transmission time unit may include a plurality of symbols used to transmit uplink control information. The symbol set includes, for example, symbols that are in the first transmission time unit and that are used to transmit uplink control information. Therefore, the network device may instruct the user equipment to map the uplink control information to all the symbols in the symbol set to send the uplink control information, so that relatively abundant uplink transmission resources are available for the uplink control information; or to map the uplink control information to some symbols in the symbol set to send the uplink control information. The network device may inform, depending on different factors such as a network status or a type of the user equipment, the user equipment of symbols to which the uplink control information is to be mapped. This is relatively flexible.

With reference to the fourth aspect, in a first possible implementation of the fourth aspect, if the control signaling is used to instruct the user equipment to map the uplink control information to some symbols in the symbol set to send the uplink control information to the network device, the control signaling further instructs the user equipment to send a reference signal to the network device on a symbol that is in the symbol set and to which the uplink control information is not mapped. In this case, the network device may further receive the reference signal on the symbol that is in the symbol set and to which the uplink control information is not mapped.

If the user equipment uses only some symbols in the symbol set to map the uplink control information, to improve transmission resource utilization, the network device may instruct the user equipment to map other information such as a reference signal to the symbol that is in the symbol set and to which the uplink control information is not mapped. In this way, the network device can receive as much information as possible by using limited transmission resources.

According to a fifth aspect, a downlink information sending method is provided, where the method is executed by a network device. The method includes: obtaining, by the network device, downlink information; and sending, by the network device, the downlink information to user equipment in a first transmission time unit. Symbols that are in the first transmission time unit and that are occupied for sending the downlink information by the network device do not include last K symbols that are in the first transmission time unit and that are used to send downlink information, where K is a positive integer.

The downlink information may include at least one of downlink control information and downlink data. To reduce a delay, it is usually expected that the network device transmits downlink data on a downlink symbol of a subframe n, and that the user equipment sends, to the network device on an uplink symbol of the subframe n, an ACK/NACK that is for the downlink data received in the subframe n. If the network device maps the downlink data to the last K symbols in symbols that are included in the first transmission time unit and that are used to transmit downlink data, the user equipment receives the downlink data and then needs to immediately perform decoding and determine an ACK/NACK that is for the downlink data. Due to a processing delay of the user equipment, the downlink data received on last K symbols of the subframe n may fail to be decoded before the first symbol that is in the subframe n and that is used to transmit uplink control information. Therefore, the ACK/NACK cannot be sent to a base station in the subframe n. Therefore, to resolve the technical problem, in this embodiment of the present application, the network device does not send the downlink data to the user equipment by using the last K symbols, so that the user equipment has relatively abundant time to decode the downlink data that is received in the subframe n. In this way, the ACK/NACK can be sent to the network device in the subframe n, and a data processing delay is reduced.

With reference to the fifth aspect, in a first possible implementation of the fifth aspect, the network device may send a reference signal to the user equipment on the last K symbols that are in the first transmission time unit and that are used to send downlink information.

If the network device does not use the last K symbols to send the downlink data, to improve transmission resource utilization, the network device may send other information such as a reference signal on the last K symbols. In this way, the network device can send as much information as possible by using limited transmission resources.

With reference to the fifth aspect or the first possible implementation of the fifth aspect, in a second possible implementation of the fifth aspect, the first transmission time unit includes first L symbols used to send downlink information, a symbol occupied by a guard period, and last M symbols used to send uplink information. The last K symbols are last K symbols in the first L symbols, where L is an integer greater than or equal to K, and M is a positive integer.

This implementation provides a structure of the first transmission time unit.

According to a sixth aspect, user equipment is provided, where the user equipment includes a processor and a communications interface. The processor is configured to obtain uplink control information, and map the uplink control information to at least two transmission time units, to send the uplink control information to a network device by using the communications interface.

With reference to the sixth aspect, in a first possible implementation of the sixth aspect, that the processor is configured to map the uplink control information to at least two transmission time units, to send the uplink control information to a network device by using the communications interface is implemented in the following manner: mapping partial information of the uplink control information to last M symbols in a first transmission time unit, and mapping remaining information of the uplink control information to first N symbols in a second transmission time unit, so as to send the uplink control information to the network device by using the communications interface. The first transmission time unit and the second transmission time unit are contiguous transmission time units, and both M and N are positive integers.

With reference to the first possible implementation of the sixth aspect, in a second possible implementation of the sixth aspect, the communications interface is further configured to receive control signaling sent by the network device, and the processor is further configured to determine a frequency domain position of the partial information of the uplink control information in the first transmission time unit based on the control signaling; or the processor is further configured to: determine downlink control information corresponding to received downlink data, and obtain a frequency domain position of the partial information in the first transmission time unit through calculation based on a number of the first control channel element of the downlink control information.

With reference to the first possible implementation of the sixth aspect or the second possible implementation of the sixth aspect, in a third possible implementation of the sixth aspect, a frequency domain position occupied by the uplink control information in the second transmission time unit is the same as the frequency domain position occupied by the uplink control information in the first transmission time unit; or there is a first offset between a frequency domain position occupied by the uplink control information in the second transmission time unit and the frequency domain position occupied by the uplink control information in the first transmission time unit.

With reference to the first possible implementation of the sixth aspect or the second possible implementation of the sixth aspect, in a fourth possible implementation of the sixth aspect, a frequency domain position occupied by the uplink control information in the second transmission time unit is P contiguous subcarriers. The P subcarriers include a subcarrier that has a smallest number and that is in an uplink time-frequency resource allocated to the user equipment in the second transmission time unit, or the P subcarriers include a subcarrier that has a largest number and that is in an uplink time-frequency resource allocated to the user equipment in the second transmission time unit, and P is a positive integer.

With reference to the sixth aspect, in a fifth possible implementation of the sixth aspect, that the processor is configured to map the uplink control information to at least two transmission time units, to send the uplink control information to a network device by using the communications interface is implemented in the following manner: repeatedly mapping the uplink control information to the at least two transmission time units, to send at least two pieces of uplink control information to the network device by using the communications interface. The at least two transmission time units are contiguous transmission time units, or the at least two transmission time units are non-contiguous transmission time units.

With reference to any one of the sixth aspect, or the first to the fifth possible implementations of the sixth aspect, in a sixth possible implementation of the sixth aspect, the transmission time unit includes one or more subframes, or the transmission time unit includes one or more slots, or the transmission time unit includes one or more symbols.

With reference to any one of the sixth aspect, or the first to the sixth possible implementations of the sixth aspect, in a seventh possible implementation of the sixth aspect, the uplink control information includes an acknowledgement/a negative acknowledgement used for a hybrid automatic repeat request, and/or channel state information.

According to a seventh aspect, a network device is provided, where the network device includes a processor and a communications interface. The processor is configured to generate a control instruction, where the control signaling is used to instruct user equipment to map uplink control information to at least two transmission time units to send the uplink control information to the network device. The communications interface is configured to send the control signaling to the user equipment, and receive, in the at least two transmission time units, the uplink control information sent by the user equipment.

With reference to the seventh aspect, in a first possible implementation of the seventh aspect, the control signaling further instructs the user equipment to map partial information of the uplink control information to last M symbols in a first transmission time unit, and map remaining information of the uplink control information to first N symbols in a second transmission time unit. The first transmission time unit and the second transmission time unit are contiguous transmission time units, and both M and N are positive integers. In this case, that the communications interface is configured to receive, in the at least two transmission time units, the uplink control information sent by the user equipment is implemented in the following manner: receiving the partial information of the uplink control information on the last M symbols in the first transmission time unit, and receiving the remaining information of the uplink control information on the first N symbols in the second transmission time.

With reference to the first possible implementation of the seventh aspect, in a second possible implementation of the seventh aspect, the control signaling further indicates a frequency domain position of the partial information of the uplink control information in the first transmission time unit; or the control signaling further instructs the user equipment to calculate a frequency domain position of the partial information of the uplink control information in the first transmission time unit based on a number of the first control channel element of downlink control information corresponding to received downlink data.

With reference to the first possible implementation or the second possible implementation of the seventh aspect, in a third possible implementation of the seventh aspect, the control signaling further indicates that a frequency domain position occupied by the uplink control information in the second transmission time unit is the same as the frequency domain position occupied by the uplink control information in the first transmission time unit; or the control signaling further indicates that there is a first offset between a frequency domain position occupied by the uplink control information in the second transmission time unit and the frequency domain position occupied by the uplink control information in the first transmission time unit.

With reference to the first possible implementation or the second possible implementation of the seventh aspect, in a fourth possible implementation of the seventh aspect, the control signaling further indicates that a frequency domain position occupied by the uplink control information in the second transmission time unit is P contiguous subcarriers. The P subcarriers include a subcarrier that has a smallest number and that is in an uplink time-frequency resource allocated to the user equipment in the second transmission time unit, or the P subcarriers include a subcarrier that has a largest number and that is in an uplink time-frequency resource allocated to the user equipment in the second transmission time unit, and P is a positive integer.

With reference to the seventh aspect, in a fifth possible implementation of the seventh aspect, the communications interface is configured to receive, in the at least two transmission time units, the uplink control information sent by the user equipment is implemented in the following manner: receiving at least two pieces of uplink control information in the at least two transmission time units. The at least two transmission time units are contiguous transmission time units, or the at least two transmission time units are non-contiguous transmission time units.

With reference to any one of the seventh aspect, or the first to the fifth possible implementations of the seventh aspect, in a sixth possible implementation of the seventh aspect, the transmission time unit includes one or more subframes, or the transmission time unit includes one or more slots, or the transmission time unit includes one or more symbols.

With reference to any one of the seventh aspect, or the first to the sixth possible implementations of the seventh aspect, in a seventh possible implementation of the seventh aspect, the uplink control information includes an acknowledgement/a negative acknowledgement used for a hybrid automatic repeat request, and/or channel state information.

According to an eighth aspect, user equipment is provided, where the user equipment includes a processor and a communications interface. The processor is configured to obtain uplink control information. The communications interface is configured to send the uplink control information to a network device in a first transmission time unit. The user equipment maps the uplink control information to all or some symbols in a symbol set included in the first transmission time unit. The symbol set includes last M symbols in the first transmission time unit, where M is a positive integer.

With reference to the eighth aspect, in a first possible implementation of the eighth aspect, if the user equipment maps the uplink control information to some symbols in the symbol set included in the first transmission time unit, the communications interface is further configured to send a reference signal to the network device on a symbol that is in the symbol set and to which the uplink control information is not mapped.

According to a ninth aspect, a network device is provided, where the network device includes a processor and a communications interface. The processor is configured to generate a control instruction, where the control signaling is used to: instruct user equipment to map uplink control information to all or some symbols in a symbol set included in a first transmission time unit, to send the uplink control information to the network device. The symbol set includes last M symbols in the first transmission time unit, where M is a positive integer. The communications interface is configured to: send the control signaling to the user equipment; and if the control signaling is used to instruct the user equipment to map the uplink control information to all the symbols in the symbol set to send the uplink control information to the network device, receive the uplink control information on all the symbols in the symbol set, or if the control signaling is used to instruct the user equipment to map the uplink control information to some symbols in the symbol set to send the uplink control information to the network device, receive the uplink control information on the some symbols in the symbol set.

With reference to the ninth aspect, in a first possible implementation of the ninth aspect, if the control signaling is used to instruct the user equipment to map the uplink control information to some symbols in the symbol set to send the uplink control information to the network device, the control signaling further instructs the user equipment to send a reference signal to the network device on a symbol that is in the symbol set and to which the uplink control information is not mapped. In this case, the communications interface is further configured to receive the reference signal on the symbol that is in the symbol set and to which the uplink control information is not mapped.

According to a tenth aspect, a network device is provided, where the network device includes a processor and a communications interface. The processor is configured to obtain downlink information. The communications interface is configured to send the downlink information to user equipment in a first transmission time unit. Symbols that are in the first transmission time unit and that are occupied for sending the downlink information by the network device do not include last K symbols that are in the first transmission time unit and that are used to send downlink information, where K is a positive integer.

With reference to the tenth aspect, in a first possible implementation of the tenth aspect, the communications interface is further configured to send a reference signal to the user equipment on the last K symbols that are in the first transmission time unit and that are used to send downlink information.

With reference to the tenth aspect or the first possible implementation of the tenth aspect, in a second possible implementation of the tenth aspect, the first transmission time unit includes first L symbols used to send downlink information, a symbol occupied by a guard period, and last M symbols used to send uplink information. The last K symbols are last K symbols in the first L symbols, where L is an integer greater than or equal to K, and M is a positive integer.

According to an eleventh aspect, user equipment is provided, where the user equipment includes functional units for executing the method provided in any one of the first aspect or the possible implementations of the first aspect.

According to a twelfth aspect, a network device is provided, where the network device includes functional units for executing the method provided in any one of the second aspect or the possible implementations of the second aspect.

According to a thirteenth aspect, user equipment is provided, where the user equipment includes functional units for executing the method provided in any one of the third aspect or the possible implementations of the third aspect.

According to a fourteenth aspect, a network device is provided, where the network device includes functional units for executing the method provided in any one of the fourth aspect or the possible implementations of the fourth aspect.

According to a fifteenth aspect, a network device is provided, where the network device includes functional units for executing the method provided in any one of the fifth aspect or the possible implementations of the fifth aspect.

According to sixteenth aspect, a computer storage medium is provided, configured to store a computer software instruction used by the foregoing user equipment, where the computer software instruction includes a program that is designed for the user equipment and that is used to execute any one of the first aspect or the possible implementations of the first aspect.

According to a seventeenth aspect, a computer storage medium is provided, configured to store a computer software instruction used by the foregoing network device, where the computer software instruction includes a program that is designed for the network device and that is used to execute any one of the second aspect or the possible implementations of the second aspect.

According to an eighteenth aspect, a computer storage medium is provided, configured to store a computer software instruction used by the foregoing user equipment, where the computer software instruction includes a program that is designed for the user equipment and that is used to execute any one of the third aspect or the possible implementations of the third aspect.

According to a nineteenth aspect, a computer storage medium is provided, configured to store a computer software instruction used by the foregoing network device, where the computer software instruction includes a program that is designed for the network device and that is used to execute any one of the fourth aspect or the possible implementations of the fourth aspect.

According to a twentieth aspect, a computer storage medium is provided, configured to store a computer software instruction used by the foregoing network device, where the computer software instruction includes a program that is designed for the network device and that is used to execute any one of the fifth aspect or the possible implementations of the fifth aspect.

In the embodiments of the present application, the user equipment may map the uplink control information to the at least two transmission time units, to send the uplink control information. In this way, the uplink control information may occupy a relatively large quantity of symbols, and coverage for a PUCCH is improved.

DETAILED DESCRIPTION

Figure 1A:
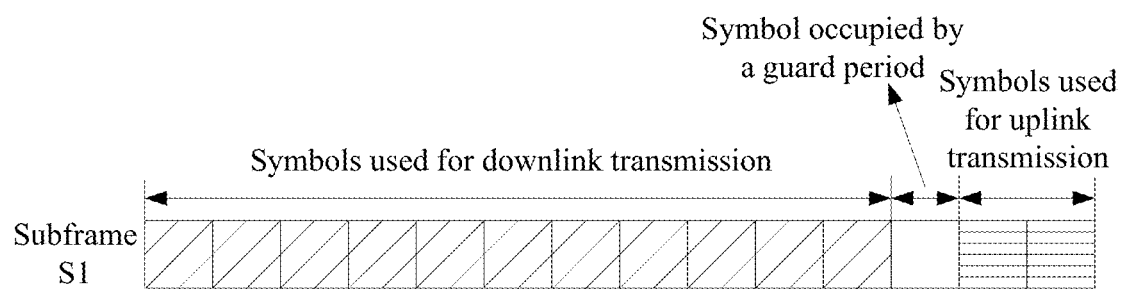
FIG. 1A is a schematic diagram of a frame structure of a subframe S1 according to an embodiment of the present application.

To make the objectives, technical solutions, and advantages of the embodiments of the present application clearer, the following clearly and completely describes the technical solutions in the embodiments of the present application with reference to the accompanying drawings in the embodiments of the present application. Apparently, the described embodiments are some but not all of the embodiments of the present application. All other embodiments obtained by a person of ordinary skill in the art based on the embodiments of the present application without creative efforts shall fall within the protection scope of the embodiments of the present application.

The following describes some terms in the embodiments of the present application, to facilitate understanding of a person skilled in the art.

(1) User equipment is a device that provides voice and/or data connectivity for a user, for example, may be a handheld device with a wireless connection function, or a processing device connected to a wireless modem. The user equipment may communicate with a core network by using a radio access network (RAN), to exchange voice/and or data with the RAN. The user equipment may be UE, a wireless terminal device, a mobile terminal device, a subscriber unit, a subscriber station, a mobile station, a mobile console, a remote station, an access point (AP), a remote terminal device (Remote Terminal), an access terminal device (Access Terminal), a user terminal device (User Terminal), a user agent, a user device (User Device), or the like. For example, the user equipment may be a mobile phone (also referred to as a "cellular" phone), a computer that has a mobile terminal device, a portable mobile apparatus, a pocket-sized mobile apparatus, a handheld mobile apparatus, a computer built-in mobile apparatus, or an in-vehicle mobile apparatus. For example, the user equipment may be a device such as a personal communications service (PCS) phone, a cordless telephone set, a Session Initiation Protocol (SIP) phone, a wireless local loop (WLL) station, or a personal digital assistant (PDA).

(2) The network device is, for example, a base station (such as an access point), and may be a device communicating with a wireless terminal device at an air interface on an access network by using one or more sectors. The base station may be configured to perform conversion between a received over-the-air frame and an Internet Protocol (IP) packet and serve as a router between the wireless terminal device and a rest portion of the access network, where the rest portion of the access network may include an IP network. The base station may further coordinate attribute management of the air interface. For example, the base station may be a radio network controller (RNC) or a base station controller (BSC), or may be an evolved NodeB (NodeB, or eNB, or e-NodeB, evolutional NodeB) in an LTE-Advanced system (LTE-A), or may be a next generation NodeB (NG-NB) in a 5G system. This is not limited in the embodiments of the present application.

(3) Uplink control information may be, for example, UCI, and the UCI includes an acknowledgement (ACK)/a negative acknowledgement (NACK) in a hybrid automatic repeat request (HARQ), and may further include some other control information in an uplink direction, such as channel state information (CSI).

(4) The terms "system" and "network" in the embodiments of the present application can be used interchangeably. "A plurality of" means two or more than two. Therefore, in the embodiments of the present application, "a plurality of" may also be understood as "at least two". The term "and/or" describes an association relationship for describing associated objects and represents that three relationships may exist. For example, A and/or B may represent the following three cases: Only A exists, both A and B exist, and only B exists. In addition, the character "/" usually indicates an "or" relationship between associated objects unless otherwise specified.

A frame structure of a subframe S1 and a frame structure of a subframe S2 introduced in a 5G system are first described.

FIG. 1A is a schematic diagram of a frame structure of a subframe S1. The subframe S1 includes 11 symbols used for downlink transmission (as shown by blocks with slashes in FIG. 1A), a GP with duration of one symbol (as shown by a blank block in FIG. 1A), and two symbols used for uplink transmission (as shown by blocks with horizontal lines in FIG. 1A). The 11 symbols used for downlink transmission include a symbol used for physical downlink control channel (PDCCH) transmission and a symbol used for physical downlink shared channel (PDSCH) transmission. Generally, the symbol used for PDCCH transmission is prior to the symbol used for PDSCH transmission. The two symbols that are in the subframe S1 and that are used for uplink transmission may be symbols used for PUCCH transmission.

Figure 1B:
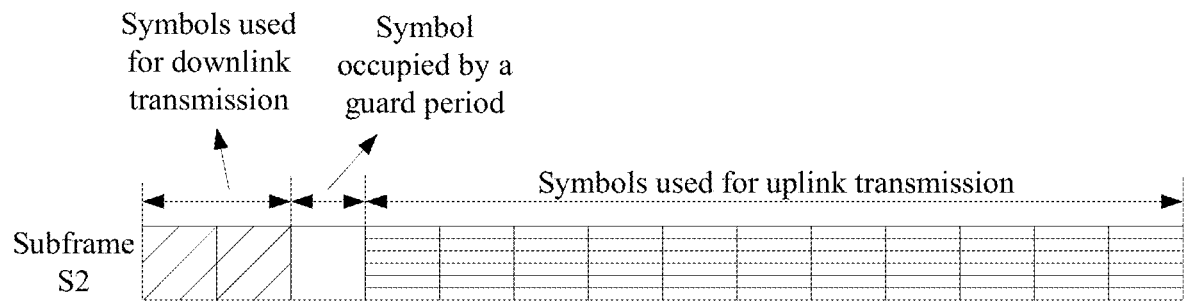
FIG. 1B is a schematic diagram of a frame structure of a subframe S2 according to an embodiment of the present application.

FIG. 1B is a schematic diagram of a frame structure of a subframe S2. The subframe S2 includes two symbols used for downlink transmission (as shown by blocks with slashes in FIG. 1B), a GP with duration of one symbol (as shown by a blank block in FIG. 1B), and 11 symbols used for uplink transmission (as shown by blocks with horizontal lines in FIG. 1B). The two symbols used for downlink transmission include a symbol used for PDCCH transmission. The 11 symbols used for uplink transmission include a symbol used for physical uplink shared channel (PUSCH) transmission and a symbol used for PUCCH transmission. Alternatively, it is very likely that the subframe S2 does not include any symbols used for PUCCH transmission. In FIG. 1B, an example in which the subframe S2 includes the symbol used for PUCCH transmission is used.

Figure 2:
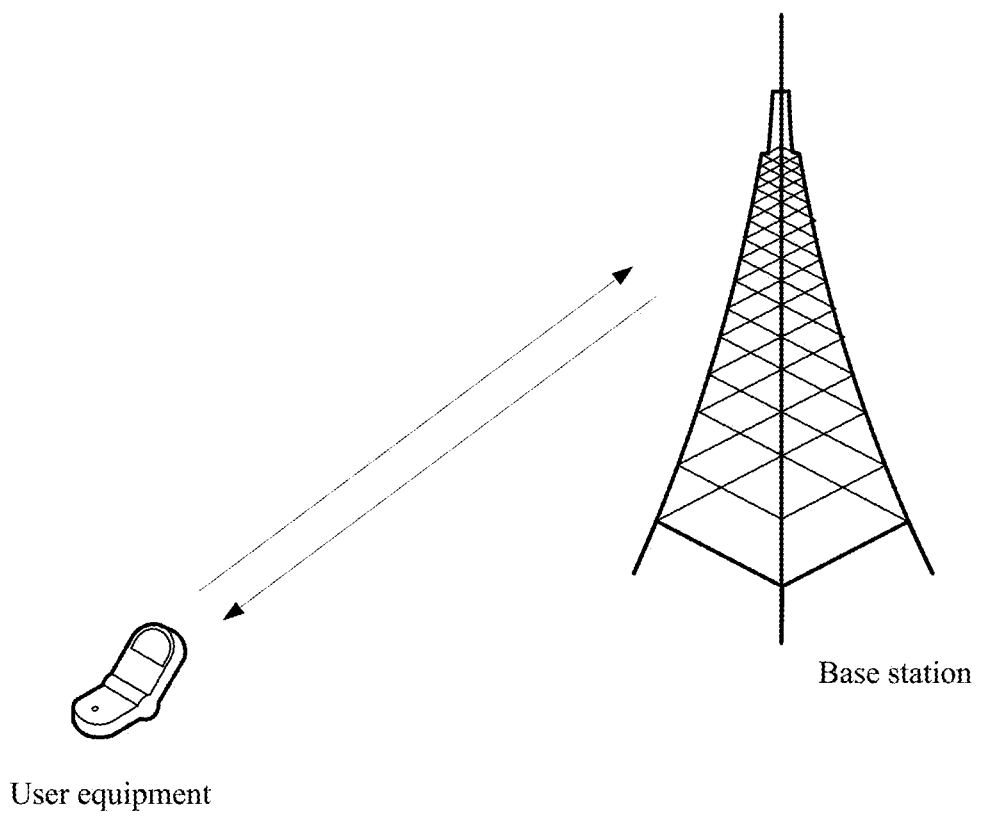
FIG. 2 is a schematic diagram of an application scenario according to an embodiment of the present application.

Referring to FIG. 2, the following describes an application scenario of the embodiments of the present application. FIG. 2 shows one network device and one user equipment. In FIG. 2, the network device is, for example, a base station, and the base station provides a service for the user equipment. In FIG. 2, if a HARQ technology is used, and if the base station sends downlink data to the user equipment by using a symbol that is included in the subframe S1 and that is used for downlink transmission, the user equipment may continue to send, to the base station by using a symbol that is included in the subframe S1 and that is used for uplink transmission, an ACK/NACK that is for the downlink data. In addition, the user equipment may further send other uplink control information to the base station by using a symbol that is included in the subframe S1 and that is used for uplink transmission.

However, the subframe S1 does not include a large quantity of symbols used for uplink transmission. For example, the subframe S1 shown in FIG. 1A includes only two symbols used for uplink transmission. Apparently, a quantity is relatively small. If the user equipment needs to send a relatively large amount of uplink control information, for example, user equipment on a cell edge generally needs a relatively large quantity of symbols to transmit uplink control information, transmission resources may be insufficient. As a result, the uplink control information cannot be sent.

To resolve the technical problem, the technical solutions of the embodiments of the present application are proposed. In the embodiments of the present application, the user equipment may map uplink control information to at least two transmission time units, to send the uplink control information. In this way, the uplink control information may occupy a relatively large quantity of symbols, coverage for a PUCCH is improved, and especially, when a relatively large amount of uplink control information needs to be transmitted, a situation in which the uplink control information fails to be transmitted due to a lack of resources can be effectively avoided.

The technical solutions provided in the embodiments of the present application may not only be used for a 5G system and a next generation communications system, but also be used for existing communications systems such as a 3rd generation mobile telecommunications (3G) system or a 4th generation mobile telecommunications (4G) system. For example, the technical solutions provided in the embodiments of the present application can also be applied to an LTE system. This is not limited in the embodiments of the present application.

In the embodiments of the present application, one transmission time unit may include one or more slots, or may include one or more subframes, or may include one or more symbols. For example, one transmission time unit may be one subframe, such as the subframe S1 or the subframe S2 in the 5G system, or a subframe in the 3G system or the 4G system, such as a subframe in the LTE system. The technical solutions provided in the embodiments of the present application can be used to increase coverage for the PUCCH. In the following descriptions, it is mostly assumed that the transmission time unit is a subframe.

The following describes the technical solutions provided in the embodiments of the present application with reference to the accompanying drawings. In the following descriptions, it is assumed that the technical solutions are applied to the scenario shown in FIG. 2 and that the network device is a base station.

Figure 3:
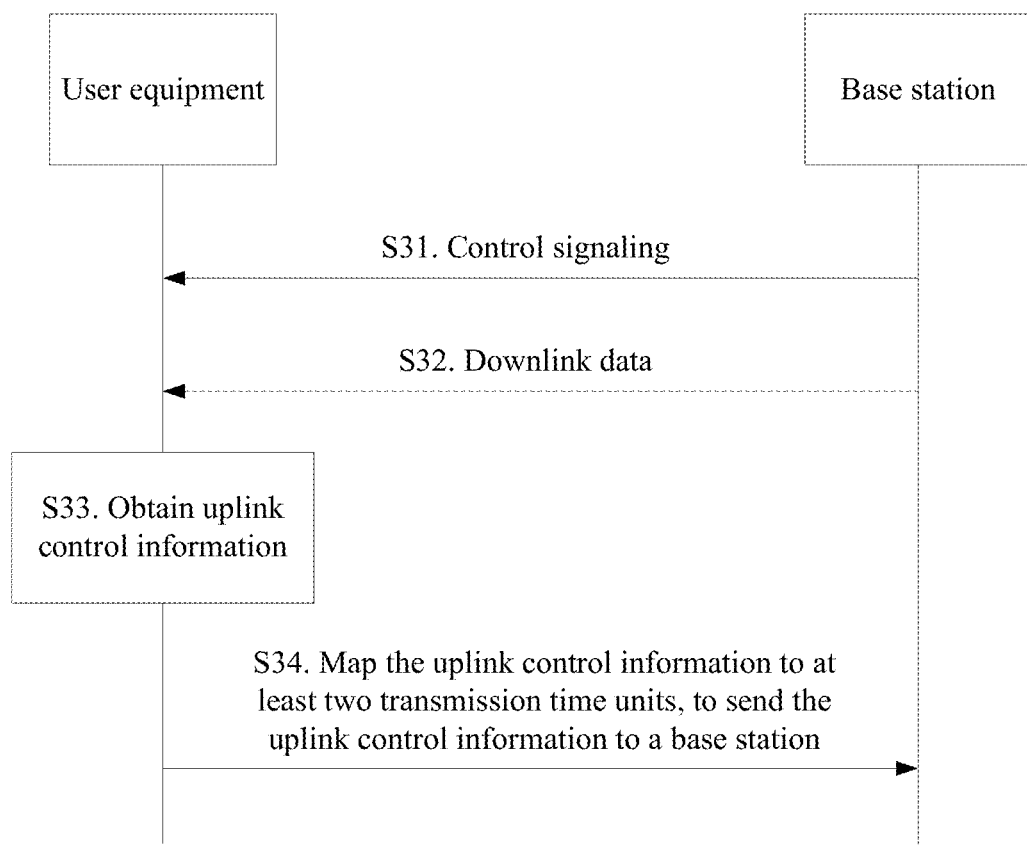
FIG. 3 is a flowchart of an uplink control information sending method according to an embodiment of the present application.

Referring to FIG. 3, an embodiment of the present application provides an uplink control information sending method. A process of the method is described below.

S31. A base station sends control signaling to user equipment, where the control signaling is used to instruct the user equipment to map uplink control information to at least two transmission time units to send the uplink control information to the base station, and the user equipment receives the control signaling.

The base station schedules the user equipment by sending the control signaling, and the control signaling may indicate a manner in which the user equipment maps the uplink control information. The control signaling may be downlink control information (DCI), or may be higher layer signaling, such as radio resource control (RRC) signaling. This is not limited in this embodiment of the present application.

S32. The base station sends downlink data to the user equipment, so that the user equipment receives the downlink data sent by the base station.

In a 5G system, the base station may send the downlink data to the user equipment by using a subframe S1, or may send the downlink data to the user equipment by using a subframe S2, or may send the downlink data to the user equipment by using another type of transmission time unit. In a 3G system or a 4G system, the base station may send the downlink data to the user equipment by using a universal subframe in a corresponding system.

For example, the base station sends the downlink data to the user equipment by using the subframe S1. Certainly, actual application is not limited thereto. The frame structure of the subframe S1 shown in FIG. 1A is still used as an example. The base station may send the downlink data to the user equipment by using a symbol that is in the subframe S1 and that is used for PDSCH transmission. The subframe S1 includes both a symbol used for downlink transmission and a symbol used for uplink transmission. Therefore, the user equipment may continue to send uplink information to the base station by using a symbol that is in the subframe S1 and that is used for uplink transmission.

In addition, for brevity, in the following, a symbol used for uplink transmission is referred to as an uplink symbol, and a symbol used for downlink transmission is referred to as a downlink symbol. Apparently, uplink symbols include a symbol used to transmit uplink control information and a symbol used to transmit uplink data, and downlink symbols include a symbol used to transmit downlink control information and a symbol used to transmit downlink data.

S32 is an optional step. Therefore, an arrow that is used to represent S32 in FIG. 3 is drawn by using a dashed line, to distinguish S32 from mandatory steps.

S33. The user equipment obtains uplink control information to be sent to the base station.

The base station sends the downlink data to the user equipment. In this case, after receiving the downlink data, the user equipment may determine, based on a reception status of the downlink data, whether to reply an ACK or a NACK to the base station. In other words, the uplink control information to be sent by the user equipment to the base station may include the ACK/NACK. Certainly, in addition to the ACK/NACK, the user equipment may further send other uplink control information such as CSI to the base station. This is not limited in this embodiment of the present application.

S34. The user equipment maps the obtained uplink control information to at least two transmission time units, to send the uplink control information to the base station. In this case, the base station receives, in the at least two transmission time units, the uplink control information sent by the user equipment.

S34 includes but is not limited to the following two implementations.

1. The user equipment maps the obtained uplink control information to two contiguous transmission time units, to send the uplink control information to the base station. In this case, the base station receives the uplink control information in the two contiguous transmission time units.

The two contiguous transmission time units are respectively referred to as a first transmission time unit and a second transmission time unit. As an example of this implementation, the first transmission time unit may be a subframe S1, and the second transmission time unit may be an uplink dedicated subframe. The uplink dedicated subframe may be an uplink (UL) subframe, and all symbols of the UL subframe are used to transmit uplink information. The symbols of the UL subframe may all be used to transmit uplink control information, or may all be used to transmit uplink data; or some of the symbols may be used to transmit uplink control information, and the rest of the symbols may be used to transmit uplink data. In this embodiment of the present application, the uplink dedicated subframe that is used as the second transmission time unit is apparently an uplink dedicated subframe in which all symbols are used to transmit uplink control information, or an uplink dedicated subframe in which some symbols are used to transmit uplink control information and remaining symbols are used to transmit uplink data.

In this implementation, the user equipment maps partial information of the uplink control information to the first transmission time unit, and maps remaining information of the uplink control information to the second transmission time unit, so as to send the uplink control information to the base station in the first transmission time unit and the second transmission time unit. The base station receives the partial information of the uplink control information in the first transmission time unit, and receives the remaining information of the uplink control information in the second transmission time unit, so that the complete uplink control information is received. In other words, the uplink control information may not only occupy an uplink symbol in the first transmission time unit, but also occupy an uplink symbol in the second transmission time unit. This apparently improves coverage of the transmission time units for a PUCCH, so that the uplink control information can be fully transmitted.

Preferably, for a purpose of continuous transmission of the uplink control information, the partial information of the uplink control information may be mapped to last M consecutive symbols in the first transmission time unit, and the remaining information of the uplink control information may be mapped to first N consecutive symbols in the second transmission time unit. In this case, the base station receives the partial information of the uplink control information on the last M symbols in the first transmission time unit, and receives the remaining information of the uplink control information on the first N symbols in the second transmission time unit. In this way, continuous mapping can be implemented, and the base station can perform continuous reception, so that both sending performance and reception performance are better. The "first" and "last" herein are used in terms of time, that is, the first N symbols and the last M symbols are respectively first and last in a time order. Both M and N are positive integers, value ranges of M and N are related to structures of the transmission time units. This is not limited in this embodiment of the present application. For example, if the first transmission time unit is the subframe S1, possible values of M include 1, 2, 3, and the like. A symbol in the first transmission time unit to which the partial information of the uplink control information is mapped, and a symbol in the second transmission time unit to which the remaining information of the uplink control information is mapped, that is, values of M and N during mapping, may be pre-defined in a protocol or a standard, or may be notified by the base station to the user equipment by using the control signaling in S31.

During mapping of the uplink control information, in addition to a time domain position occupied by the uplink control information in a transmission time unit, a frequency domain position occupied by the uplink control information in the transmission time unit further needs to be learned of. This is described below.

In this embodiment of the present application, a frequency domain position occupied by the partial information of the uplink control information in the first transmission time unit may be notified by the base station to the user equipment. For example, the base station informs, by using the control information in S31, the user equipment of the frequency domain position occupied by the uplink control information in the first transmission time unit. Alternatively, the frequency domain position occupied by the partial information of the uplink control information in the first transmission time unit may be calculated by the user equipment. A calculation manner is: determining, by the user equipment, downlink control information corresponding to received downlink data, and obtaining the frequency domain position of the partial information of the uplink control information in the first transmission time unit through calculation based on a number of the first control channel element (CCE) of the downlink control information. The downlink data corresponding to the downlink control information that is used for calculation of the frequency domain position may be downlink data received by the user equipment in the first transmission time unit, or may be downlink data received by the user equipment in transmission time units before the first transmission time unit. If the frequency domain position occupied by the partial information of the uplink control information in the first transmission time unit needs to be calculated by the user equipment, the base station may instruct, by using the control information in S31, the user equipment to calculate the frequency domain position occupied by the partial information of the uplink control information in the first transmission time unit, or the user equipment determines, based on a pre-definition in a protocol or a standard, that the user equipment needs to calculate, based on a number of a CCE, the frequency domain position occupied by the partial information of the uplink control information in the first transmission time unit.

The foregoing paragraph describes how the user equipment learns of the frequency domain position occupied by the partial information of the uplink control information in the first transmission time unit, and the following describes how the user equipment learns of a frequency domain position occupied by the remaining information of the uplink control information in the second transmission time unit. In this embodiment of the present application, the frequency domain position occupied by the remaining information of the uplink control information in the second transmission time unit is related to whether the user equipment needs to send uplink data in the second transmission time unit.

If the user equipment does not send uplink data in the second transmission time unit, the frequency domain position occupied by the remaining information of the uplink control information in the second transmission time unit may also be notified by the base station to the user equipment. For example, the base station informs, by using the control information in S31, the user equipment of the frequency domain position occupied by the uplink control information in the second transmission time unit. The base station may directly inform the user equipment of the frequency domain position that is specifically occupied by the uplink control information in the second transmission time unit, or the base station may inform the user equipment that the frequency domain position occupied by the uplink control information in the second transmission time unit is the same as the frequency domain position occupied by the partial information of the uplink control information in the first transmission time unit. Alternatively, there may be a first offset between the frequency domain position occupied by the remaining information of the uplink control information in the second transmission time unit and the frequency domain position occupied by the partial information of the uplink control information in the first transmission time unit. In this case, the base station may inform, by using the control signaling in S31, the user equipment that there is the first offset between the two frequency domain positions. Therefore, after obtaining the frequency domain position occupied by the partial information of the uplink control information in the first transmission time unit, the user equipment may obtain, based on the frequency domain position occupied by the partial information of the uplink control information in the first transmission time unit and the first offset, the frequency domain position occupied by the remaining information of the uplink control information in the second transmission time unit. The first offset may be notified by the base station to the user equipment, may be pre-defined in a standard or a protocol, may be obtained by the user equipment through calculation based on a number of the first transmission time unit, or may be obtained by the user equipment through calculation based on a number of the second transmission time unit.

Regardless of how the user equipment obtains the frequency domain position occupied by the remaining information of the uplink control information in the second transmission time unit, when the user equipment does not send uplink data in the second transmission time unit, the frequency domain position occupied by the partial information of the uplink control information in the first transmission time unit and the frequency domain position occupied by the remaining information of the uplink control information in the second transmission time unit may be the same or may be different. When the frequency domain positions are different, in a possible implementation, there is the first offset between the frequency domain positions.

If the user equipment does not send uplink data in the second transmission time unit, the frequency domain position occupied by the remaining information of the uplink control information in the second transmission time unit may be P contiguous subcarriers in the second transmission time unit. The P subcarriers include a subcarrier that has a smallest number and that is in an uplink time-frequency resource allocated to the user equipment in the second transmission time unit, or the P subcarriers include a subcarrier that has a largest number and that is in an uplink time-frequency resource allocated to the user equipment in the second transmission time unit, and P is a positive integer. This may be understood as follows: The remaining information of the uplink control information is mapped to a frequency domain edge of the uplink time-frequency resource allocated to the user equipment, and a central frequency domain position is not occupied as far as possible, so that continuous mapping of other uplink information in frequency domain is unaffected as far as possible when continuous mapping of the remaining information of the uplink control information is ensured. Which subcarriers in the uplink time-frequency resource that is allocated to the user equipment in the second transmission time unit are the P subcarriers may be notified by the base station to the user equipment, for example, may be notified by the base station to the user equipment along with the control signaling in S31; or may be pre-defined in a protocol or a standard. In this case, if the user equipment needs to map uplink data to the first N symbols in the second transmission time unit, and the uplink data occupies the P subcarriers in frequency domain, the remaining information of the uplink control information is carried in the uplink data in the second transmission time unit, and is sent along with the uplink data. In this way, the uplink control information can be sent along with the data, so that a quantity of symbols for sending the uplink control information is increased without affecting data sending.

In this embodiment of the present application, a quantity of subcarriers occupied by the partial information of the uplink control information in the first transmission time unit is the same as a quantity of subcarriers occupied by the remaining information of the uplink control information in the second transmission time unit. For example, both occupy six subcarriers or 12 subcarriers.

2. The user equipment repeatedly maps the uplink control information to the at least two transmission time units, to send at least two pieces of uplink control information to the base station. In other words, the uplink control information is repeatedly sent to the base station. The at least two transmission time units may be contiguous transmission time units, or may be non-contiguous transmission time units. In addition, types of the at least two transmission time units may be the same, for example, both are the subframe S1 or both are the subframe S2; or types of the at least two transmission time units may be different, for example, one transmission time unit is the subframe S1, and the other transmission time unit is a UL subframe.

In other words, in the first implementation described above, partial information of the uplink control information is transmitted by using one transmission time unit, and the base station receives the complete uplink control information in two contiguous transmission time units. In this second implementation, the complete uplink control information is transmitted by using one transmission time unit, and the base station receives at least two pieces of complete uplink control information in at least two transmission time units. In other words, the base station may receive one piece of complete uplink control information by using each transmission time unit, and this is equivalent to that the uplink control information is repeatedly sent.

In this manner, the uplink control information may be mapped to an uplink symbol in the transmission time unit, to send the uplink control information. Details about a mapping manner are not described.

In this embodiment of the present application, which transmission time units are the at least two transmission time units may be notified by the base station to the user equipment. For example, the base station informs, by using the control signaling in S31, the user equipment of numbers of the at least two transmission time units. Alternatively, which transmission time units are the at least two transmission time units may be pre-defined in a protocol or a standard. In this case, the base station merely needs to inform, by using the control signaling in S31, the user equipment of a to-be-used mapping manner, and if the mapping manner in the second implementation is used, the user equipment learns, based on pre-defined information, how to select the at least two transmission time units. For example, the first subframe S1 after the subframe S1 is pre-defined to be used to repeatedly send the uplink control information.

In this embodiment of the present application, a quantity of times of repeated sending, that is, a quantity of at least two subframes, may be notified by the base station to the user equipment, for example, may be notified by the base station to the user equipment by using the control signaling in S31; or may be pre-defined in a protocol or a standard, for example, the quantity of times of repeated sending is pre-defined to be two provided that such a manner of repeated sending is used.

In this embodiment of the present application, a type of a subframe in which repeated sending is allowed may be notified by the base station to the user equipment, for example, may be notified by the base station to the user equipment by using the control signaling in S31; or may be pre-defined in a protocol or a standard, for example, the subframe S1, the subframe S2, and the UL subframe may all be pre-defined to be used in repeated sending.

In this implementation, the uplink control information may be repeatedly sent in the at least two transmission time units, so that coverage for a PUCCH is improved. Especially when a channel status is relatively poor, a sending success rate of the uplink control information may be improved by repeatedly sending the uplink control information for a plurality of times.

According to the technical solution provided in this embodiment of the present application, regardless of whether the uplink control information is sent by using two contiguous transmission time units or the uplink control information is repeatedly sent, a quantity of symbols used to send the uplink control information can be increased, so that coverage for the PUCCH is improved.

A transmission time unit may include a plurality of symbols used to transmit uplink control information. For example, the subframe S1 may include two or three symbols used to transmit uplink control information. Therefore, when the user equipment sends the uplink control information, there is an issue of how to perform mapping, that is, a symbol to which the uplink control information is specifically mapped for sending needs to be learned of. To resolve the technical problem, referring to FIG. 4, an embodiment of the present application provides an uplink control information sending method.

S41. A base station sends control signaling to user equipment, where the control signaling is used to: instruct the user equipment to map uplink control information to all or some symbols in a symbol set included in a first transmission time unit, to send the uplink control information to the base station. In this case, the user equipment receives the control signaling. The symbol set includes last M symbols in the first transmission time unit, where M is a positive integer.

For example, if the first transmission time unit is a subframe S1, the last M symbols may be all symbols that are included in the subframe S1 and that are used to transmit uplink control information.

The base station schedules the user equipment by sending the control signaling, and the control signaling may indicate a manner in which the user equipment maps the uplink control information. The control signaling may be DCI, or may be higher layer signaling, such as RRC signaling. This is not limited in this embodiment of the present application.

S42. The user equipment obtains uplink control information to be sent to the base station.

The base station sends downlink data to the user equipment. In this case, after receiving the downlink data, the user equipment may determine, based on a reception status of the downlink data, whether to reply an ACK or a NACK to the base station. In other words, the uplink control information to be sent by the user equipment to the base station may include the ACK/NACK. Certainly, in addition to the ACK/NACK, the user equipment may further send other uplink control information such as CSI to the base station. This is not limited in this embodiment of the present application.

S43. The user equipment maps the obtained uplink control information to all the symbols in the symbol set in the first transmission time unit, to send the uplink control information to the base station. In this case, the base station receives the uplink control information on all the symbols in the symbol set in the first transmission time unit. Alternatively, the user equipment maps the uplink control information to some symbols in the symbol set in the first transmission time unit, to send the uplink control information to the base station. In this case, the base station receives the uplink control information on the some symbols in the symbol set in the first transmission time unit. The user equipment performs mapping in a manner indicated by the control signaling sent by the base station.

For example, the first transmission time unit is the subframe S1 shown in FIG. 1A. The subframe S1 includes two symbols used to send uplink control information, that is, last two symbols of the subframe S1. Therefore, the symbol set of the subframe S1 may include the last two symbols of the subframe S1. In this case, the base station may instruct, by using the control signaling, the user equipment to map the uplink control information to a last but one symbol of the subframe S1; or the base station may instruct, by using the control signaling, the user equipment to map the uplink control information to a last symbol of the subframe S1; or the base station may instruct, by using the control signaling, the user equipment to map the uplink control information to the last two symbols of the subframe S1. In other words, the base station may instruct, depending on different situations, the user equipment to use different mapping manners. This is relatively flexible.

By using the subframe S1, the base station can transmit the downlink data on a downlink symbol of a subframe n, and the user equipment can send, to the base station on an uplink symbol of the subframe n, an ACK/NACK that is for the downlink data received in the subframe n. In this case, if the user equipment sends the NACK, it is usually expected that the base station performs data retransmission in a subframe n+1. Referring to FIG. 1A, generally, symbols that are included in the subframe S1 and that are used to transmit uplink control information are all located in last positions in the subframe S1. Therefore, if the user equipment maps the uplink control information, such as the ACK/NACK, to last M symbols of the subframe S1 to send the uplink control information to the base station, due to a processing delay of the base station, the ACK/NACK received on last M symbols of the subframe n may fail to be decoded before the first symbol of the subframe n+1. As a result, retransmission cannot be performed in the subframe n+1. M is a positive integer, and a value range of M is related to a structure of a transmission time unit. This is not limited in this embodiment of the present application. For example, for the subframe S1, possible values of M include 1, 2, 3, and the like.

To resolve the problem, the base station may determine, depending on an actual situation, mapping manners used by different user equipments. For example, for some user equipments that are relatively sensitive to a delay, that is, for user equipments that have a relatively high requirement on a delay, such as user equipment that performs an ultra-reliable and low latency communications (URLLC) service, the base station generally needs to retransmit, in the subframe n+1, the downlink data that is in the subframe n. In this case, the base station may instruct such user equipment to map the uplink control information to some symbols in the symbol set included in the first transmission time unit. For example, if the first transmission time unit includes M symbols used to transmit uplink control information, and the M symbols are the last M symbols in the first transmission time unit, the base station indicates that a symbol for mapping the uplink control information by such user equipment does not include last H symbols in the first transmission time unit, where H is a positive integer less than M. In other words, the last H symbols in the first transmission time unit are not used to send the uplink control information, so that the base station has relatively abundant decoding time, so as to ensure, as far as possible, that the base station can retransmit, in the subframe n+1, the downlink data that is in the subframe n. For example, the first transmission time unit is the subframe S1 shown in FIG. 1A, and M=2. In this case, H=1. To be specific, the user equipment maps the uplink control information to the last but one symbol of the subframe S1 to send the uplink control information to the base station, without mapping the uplink control information to the last symbol of the subframe S1.

Alternatively, for some delay-insensitive user equipments, that is, user equipments that have a low requirement on a delay, such as user equipment that performs an Enhanced Mobile Broadband (eMBB) service, the base station generally does not need to retransmit, in the subframe n+1, the downlink data that is in the subframe n. In this case, the base station may instruct such user equipment to map the uplink control information to all or some symbols in the symbol set included in the first transmission time unit, and if the uplink control information is mapped to some symbols, the some symbols are not limited. For example, if the first transmission time unit includes M symbols used to transmit uplink control information, and the M symbols are the last M symbols in the first transmission time unit, the base station indicates that a symbol for mapping the uplink control information by such user equipment is any one or more of the M symbols. Certainly, the uplink control information is preferably mapped to consecutive symbols, to facilitate reception of the base station. For example, the first transmission time unit is the subframe S1 shown in FIG. 1A, and M=2. In this case, the user equipment may map the uplink control information to the last but one symbol of the subframe S1, to send the uplink control information to the base station; or the user equipment may map the uplink control information to the last symbol of the subframe S1, to send the uplink control information to base station; or the user equipment may map the uplink control information to the last two symbols of the subframe S1, to send the uplink control information to the base station.

If the base station instructs the user equipment to map the uplink control information to some symbols in the first transmission time unit to send the uplink control information to the base station, the symbols that are included in the first transmission time unit and that are used to send uplink control information may include some symbols to which the uplink control information is not mapped. If these symbols do not carry any information, there is a waste of resources. Therefore, in this embodiment of the present application, if the base station instructs the user equipment to map the uplink control information to some symbols in the first transmission time unit to send the uplink control information to the base station, the base station may further instruct, by using the control signaling in S41, the user equipment to send a reference signal to the base station on a symbol that is in the symbol set in the first transmission time unit and to which the uplink control information is not mapped. In this way, all symbols in the first transmission time unit can be fully utilized, and a waste of resources is avoided. The reference signal herein may be a sounding reference signal (SRS), and certainly may alternatively be another possible reference signal. Alternatively, if the base station instructs the user equipment to map the uplink control information to some symbols in the first transmission time unit to send the uplink control information to the base station, the user equipment may determine, according to a rule pre-defined in a standard or a protocol, to send a reference signal to the base station on a symbol that is in the symbol set in the first transmission time unit and to which the uplink control information is not mapped, with no need for an additional instruction of the base station. A frequency domain position occupied by the reference signal in the first transmission time unit may be the same as a frequency domain position occupied by the uplink control information, or the reference signal in the first transmission time unit may occupy, in frequency domain, an entire uplink frequency domain resource that is allocated to the user equipment in the first transmission time unit.

For example, the first transmission time unit is the subframe S1 shown in FIG. 1A, and M=2. The user equipment maps, according to an instruction of the base station, the uplink control information to the last but one symbol of the subframe S1 to send the uplink control information to the base station, and the user equipment may further map, according to an instruction of the base station or according to a rule pre-defined in a protocol or a standard, the reference signal to the last symbol of the subframe S1 to send the reference signal to the base station. Therefore, all symbols of the subframe S1 can be effectively utilized. In other words, as much information as possible can be transmitted by using as few transmission time units as possible.

According to the technical solution provided in this embodiment of the present application, a user can map the uplink control information in a proper mapping manner. Further, for some delay-sensitive user equipments, the base station can perform initial transmission in the subframe n and retransmission in the subframe n+1 as far as possible, so that a delay requirement is met, and a waste of time-frequency resources can be avoided as far as possible.

By using the subframe S1, the base station can transmit downlink data on a downlink symbol of a subframe n, and the user equipment can send, to the base station on an uplink symbol of the subframe n, an ACK/NACK that is for the downlink data received in the subframe n. The subframe S1 shown in FIG. 1A is used as an example. If the base station maps the downlink data to last K symbols in symbols that are included in the subframe S1 and that are used to transmit downlink data, after receiving the downlink data, the user equipment needs to immediately perform decoding and determine an ACK/NACK that is for the downlink data. Due to a processing delay of the user equipment, the downlink data received on last K symbols of the subframe n may fail to be decoded before the first symbol that is in the subframe n and that is used to transmit uplink control information. As a result, the ACK/NACK cannot be sent to the base station in the subframe n. K is a positive integer, and K may be less than or equal to a quantity of symbols that are included in the subframe S1 and that are used to transmit downlink data.

Figure 5:
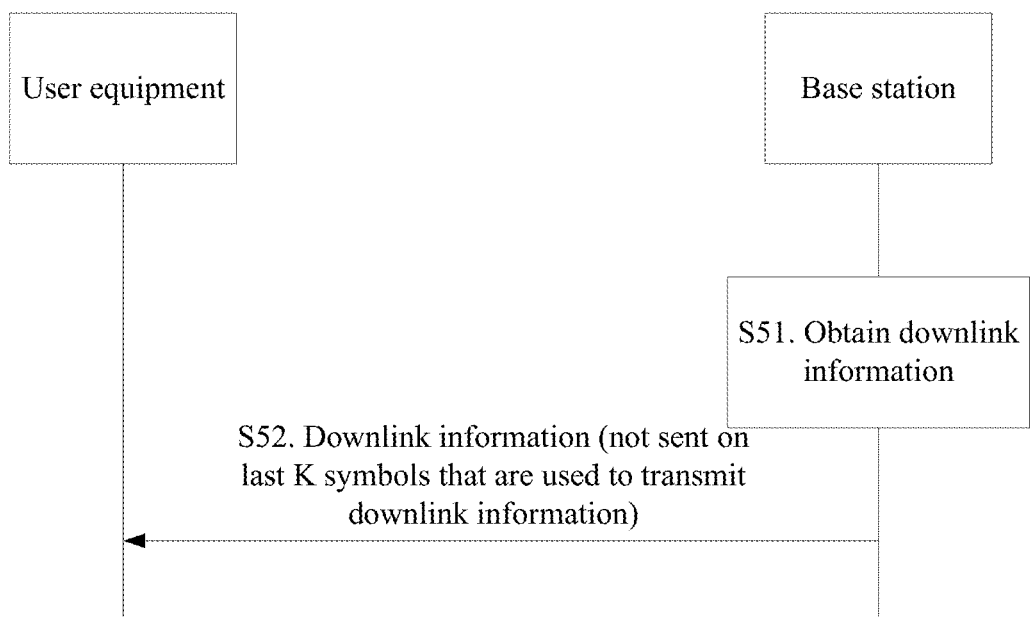
FIG. 5 is a flowchart of a downlink information sending method according to an embodiment of the present application.

To resolve the technical problem, referring to FIG. 5, an embodiment of the present application provides a downlink information sending method.

S51. A base station obtains downlink information that is to be sent to user equipment.

The downlink information that is to be sent by the base station to the user equipment may include downlink data, and may also include downlink control information.

S52. The base station sends the downlink information to the user equipment in a first transmission time unit.

The first transmission time unit includes first L symbols used to send downlink information, a symbol occupied by a GP, and last M symbols used to send uplink information, where M is a positive integer. If the first transmission time unit is the subframe S1 shown in FIG. 1A, L=11, that is, first 11 symbols of the subframe S1 are used to send downlink information; one symbol is occupied by the GP; and M=2, that is, last two symbols are used to send uplink information.

The base station may send the downlink information to the user equipment by using the first L symbols. However, if last K symbols in the first L symbols are occupied when the base station sends the downlink information, there may not be enough time for the user equipment to perform decoding after receiving the downlink information on the last K symbols. Consequently, the user equipment may fail to feed back, to the base station on the last M symbols in the first transmission time unit, uplink control information that is for the downlink information. K is a positive integer, and L is an integer greater than or equal to K. Therefore, in this embodiment of the present application, the base station may not send the downlink information to the user equipment on the last K symbols in the first L symbols, that is, may not map the uplink control information to the last K symbols in the first L symbols, but send the downlink information to the user equipment by using remaining symbols other than the last K symbols in the first L symbols. Therefore, the user equipment may have relatively abundant time to perform decoding after receiving the downlink information, so as to send, to the base station on the last M symbols in the first transmission time unit, the uplink control information that is for the downlink information. A value of K is related to a structure of a transmission time unit, and is also related to a decoding capability of the user equipment, and may be notified by the base station to the user equipment, or may be pre-defined in a protocol or a standard. This is not limited in this embodiment of the present application.

The subframe S1 shown in FIG. 1A is used as an example, and K=1 is used as an example. If first 11 symbols of the subframe S1 are used to send downlink information, when mapping downlink data, the base station choose not to map the downlink data to a last symbol in the 11 symbols. Therefore, after receiving the downlink data, the user equipment may have relatively abundant time to perform decoding, and determine an ACK/NACK that is for the received downlink data, so as to send the ACK/NACK to the base station on last two symbols of the subframe S1, thereby implementing feedback in a timely manner, and helping the base station determine, as fast as possible, whether to continue to transmit new data or perform retransmission.

If the base station does not map the downlink information to the last K symbols in the first L symbols in the first transmission time unit, no downlink information is mapped to the last K symbols, and the last K symbols may be in an idle state. If these symbols do not carry any information, there is a waste of resources. Therefore, in this embodiment of the present application, if the base station does not map the downlink information to the last K symbols in the first L symbols in the first transmission time unit, the base station may further map a reference signal to the last K symbols. In this way, all symbols in the first transmission time unit can be fully utilized, and a waste of resources is avoided. The reference signal herein may be a channel state information-reference signal (CSI-RS), and certainly may alternatively be another possible reference signal.

According to the technical solution provided in this embodiment of the present application, the base station can perform transmission in the subframe n, the user equipment also performs feedback in the subframe n, and a waste of time-frequency resources can be avoided as far as possible.

The following describes devices provided in the embodiments of the present application with reference to the accompanying drawings.

Figure 6:
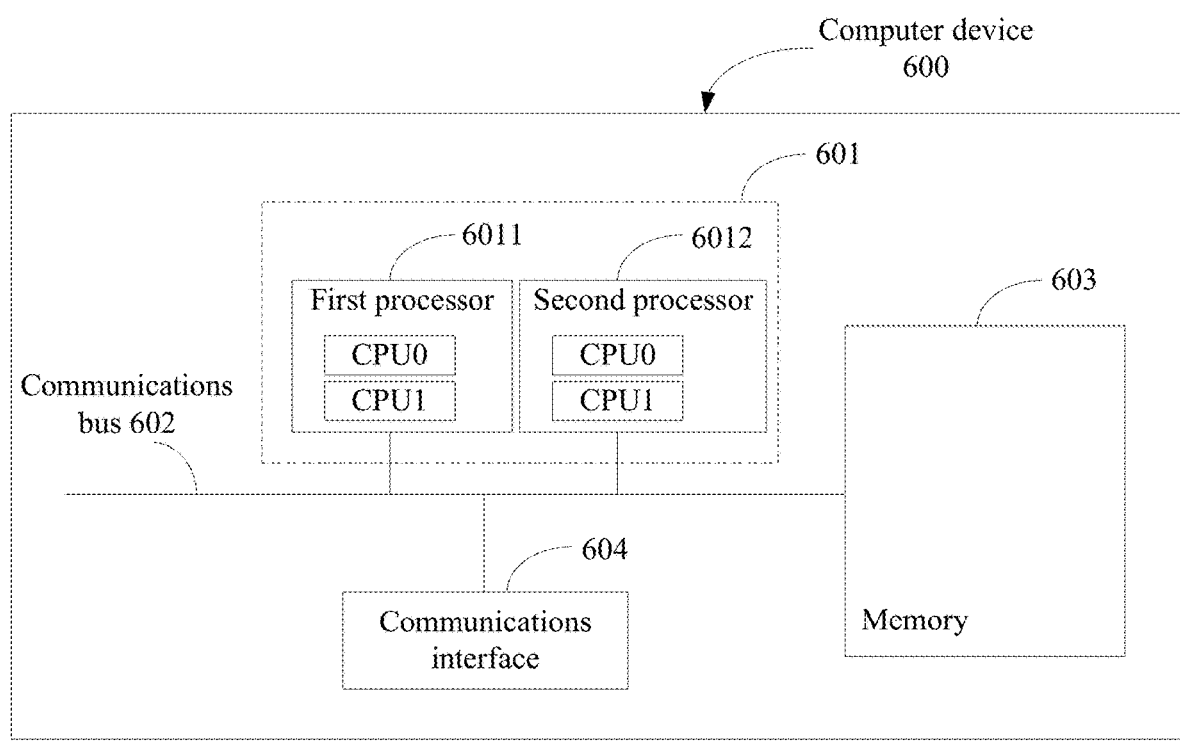
FIG. 6 is a schematic structural diagram of a computer device according to an embodiment of the present application.

FIG. 6 is a schematic diagram of a computer device 600 according to an embodiment of the present application. The computer device 600 includes at least one processor 601, a communications bus 602, a memory 603, and at least one communications interface 604. In this embodiment of the present application, the computer device 600 shown in FIG. 6 may be configured to implement the network device in the embodiment shown in any one of accompanying drawings FIG. 3 to FIG. 5, or may be configured to implement the user equipment in the embodiment shown in any one of accompanying drawings FIG. 3 to FIG. 5.

The processor 601 may be a general-purpose central processing unit (CPU), a microprocessor, an application-specific integrated circuit (ASIC), or one or more integrated circuits that are configured to control execution of a program in the solution of the present application.

The communications bus 602 may include a path, and transmit information between the foregoing components. The communications interface 604 may be any transceiver-type apparatus, and is configured to communicate with another device or a communications network, for example, an Ethernet, a radio access network (RAN), or a wireless local area network (WLAN).

The memory 603 may be a read-only memory (ROM) or another type of static storage device that can store static information and a static instruction, may be a random access memory (RAM) or another type of dynamic storage device that can store information and an instruction, or may be an electrically erasable programmable read-only memory (EE-PROM), a compact disc read-only memory (CD-ROM) or another compact disc storage medium, an optical disc storage medium (including a compact disc, a laser disc, an optical disc, a digital versatile disc, a Blu-ray disc, and the like), a magnetic disk storage medium or another magnetic storage device, or any other medium that can be configured to carry or store desired program code in a form of an instruction or a data structure and that can be accessed by a computer. However, the memory 603 is not limited thereto.

The memory 603 may exist independently, and be connected to the processor 601 by using the bus, or the memory 603 may be integrated with the processor 601.

The memory 603 is configured to store application program code for executing the solutions of the present application, and the execution is controlled by using the processor 601. The processor 601 is configured to execute the application program code stored in the memory 603. If a signaling processing network element, a control plane network element, or a user plane network element are implemented by using the computer device 600, the memory 603 in the signaling processing network element, the control plane network element, or the user plane network element may store one or more software modules, and the signaling processing network element, the control plane network element, or the user plane network element may implement the stored software module by using the processor 601 and the program code in the memory 603, to determine or process a fault.

In specific implementation, in an embodiment, the processor 601 may include one or more CPUs, for example, a CPU0 and a CPU1 in FIG. 6.

In specific implementation, in an embodiment, the computer device 600 may include a plurality of processors 601, for example, a first processor 6011 and a second processor 6012 in FIG. 6. The first processor 6011 and the second processor 6012 have different names and different marks in the accompanying drawing, merely for a purpose of distinguishing between the plurality of processors 601. Each of the processors 601 may be a single-core (single-CPU) processor 601, or a multi-core (multi-CPU) processor 601. The processor 601 herein may be one or more devices, circuits, and/or processing cores for processing data (for example, a computer program instruction).

The foregoing computer device 600 may be a general-purpose computer device or a special-purpose computer device. In specific implementation, the computer device 600 may be a desktop computer, a portable computer, a network server, a palmtop computer (Personal Digital Assistant, PDA), a mobile phone, a tablet computer, a wireless terminal device, a communications device, an embedded device, or a device having a structure similar to that shown in FIG. 10. A type of the computer device 600 is not limited in this embodiment of the present application.

Figure 7:
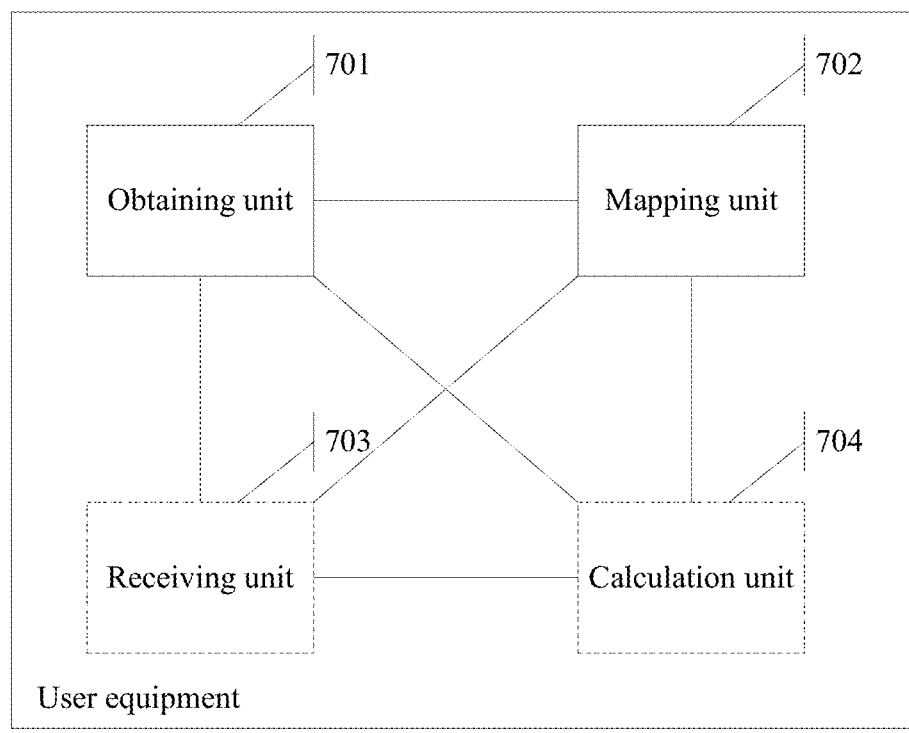
FIG. 7 is a schematic structural diagram of user equipment according to an embodiment of the present application.

Referring to FIG. 7, an embodiment of the present application provides user equipment, where the user equipment includes an obtaining unit 701 and a mapping unit 702.

Optionally, the user equipment may further include a receiving unit 703 and a calculation unit 704 that are also shown in FIG. 7. Because the receiving unit 703 and the calculation unit 704 are optional functional units, the receiving unit 703 and the calculation unit 704 are drawn in dashed lines in FIG. 7, to distinguish from the mandatory functional units.

In actual application, a physical device corresponding to the receiving unit 703 may be the communications interface 604 in FIG. 6, and a physical device corresponding to the obtaining unit 701, the mapping unit 702, and the calculation unit 704 may be the processor 601 in FIG. 6. It may be considered that, when the user equipment is implemented by using the computer device 600 shown in FIG. 6, in the communications interface 604 in FIG. 6, some communications interfaces 604 implement a function of the receiving unit 703, and some communications interfaces 604 can implement a data sending function; or it may be considered that, in the communications interface 604 in FIG. 6, all communications interfaces 604 possibly can implement both a function of the receiving unit 703 and a data sending function.

The user equipment may be configured to perform the foregoing method provided in the embodiment shown in FIG. 3, and may be, for example, the user equipment described above. Therefore, for functions implemented by the units in the user equipment and the like, reference may be made to descriptions in the method part, and details are not described again.

Figure 8:
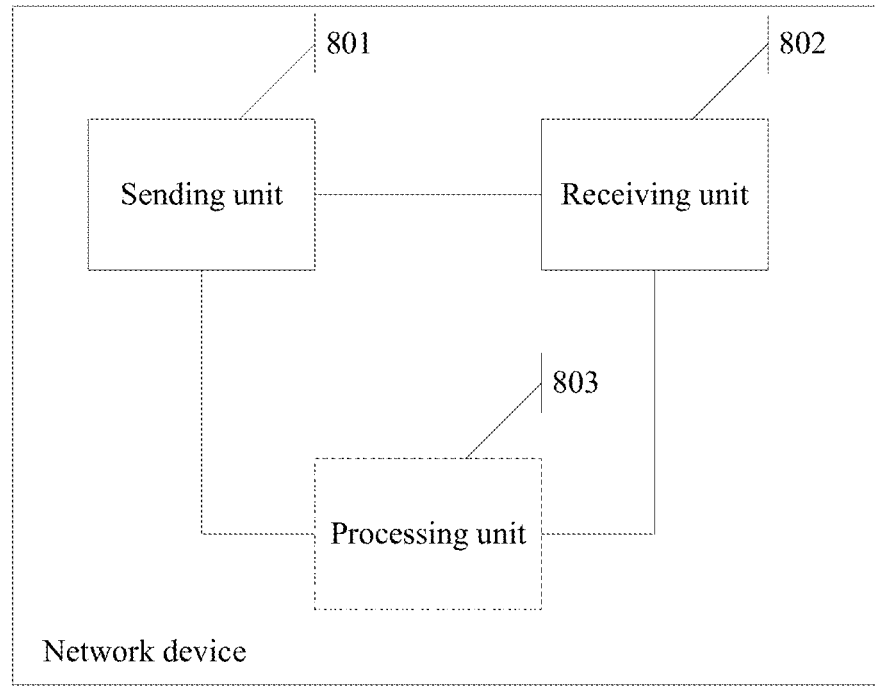
FIG. 8 is a schematic structural diagram of a network device according to an embodiment of the present application.

Referring to FIG. 8, an embodiment of the present application provides a network device, where the network device includes a sending unit 801 and a receiving unit 802. The sending unit 801 is configured to send control signaling to user equipment, and the receiving unit 802 is configured to receive, in at least two transmission time units, uplink control information sent by the user equipment.

Optionally, the network device may further include a processing unit 803, configured to generate the control signaling. The processing unit 803 is also shown in FIG. 8. Because the processing unit 803 is an optional functional unit, the processing unit 803 is drawn in dashed lines in FIG. 8, to distinguish from the mandatory functional units.

In actual application, a physical device corresponding to the sending unit 801 and the receiving unit 802 may be the communications interface 604 in FIG. 6, and a physical device corresponding to the processing unit 803 may be the processor 601 in FIG. 6. It may be considered that, when the network device is implemented by using the computer device 600 shown in FIG. 6, in the communications interface 604 in FIG. 6, some communications interfaces 604 implement a function of the receiving unit 802, and some communications interfaces 604 implement a function of the sending unit 801; or it may be considered that, in the communications interface 604 in FIG. 6, all communications interfaces 604 or some communications interfaces 604 possibly can implement both a function of the receiving unit 802 and a function of the sending unit 801.

The network device may be configured to perform the foregoing method provided in the embodiment shown in FIG. 3, and may be, for example, the base station described above. Therefore, for functions implemented by the units in the network device and the like, reference may be made to descriptions in the method part, and details are not described again.

Figure 9:
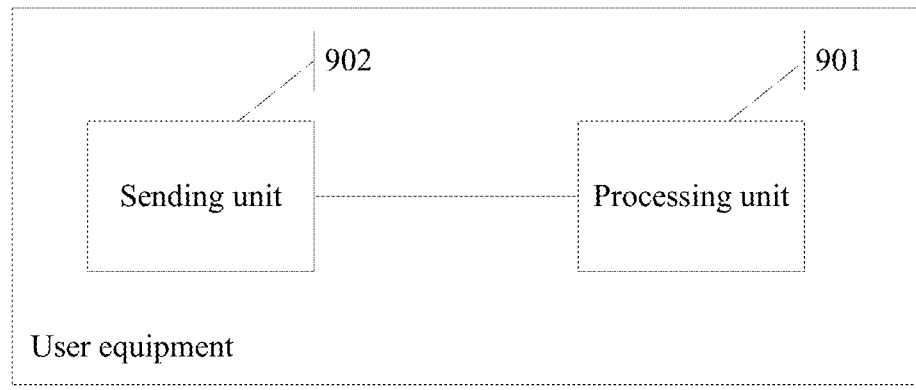
FIG. 9 is a schematic structural diagram of user equipment according to an embodiment of the present application.

Referring to FIG. 9, an embodiment of the present application provides user equipment, where the user equipment includes a processing unit 901 and a sending unit 902.

In actual application, a physical device corresponding to the sending unit 902 may be the communications interface 604 in FIG. 6, and a physical device corresponding to the processing unit 901 may be the processor 601 in FIG. 6. It may be considered that, when the user equipment is implemented by using the computer device 600 shown in FIG. 6, in the communications interface 604 in FIG. 6, some communications interfaces 604 implement a data receiving function, and some communications interfaces 604 implement a function of the sending unit 902; or it may be considered that, in the communications interface 604 in FIG. 6, all communications interfaces 604 or some communications interfaces 604 possibly can implement both a data receiving function and a function of the sending unit 902.

Figure 4:
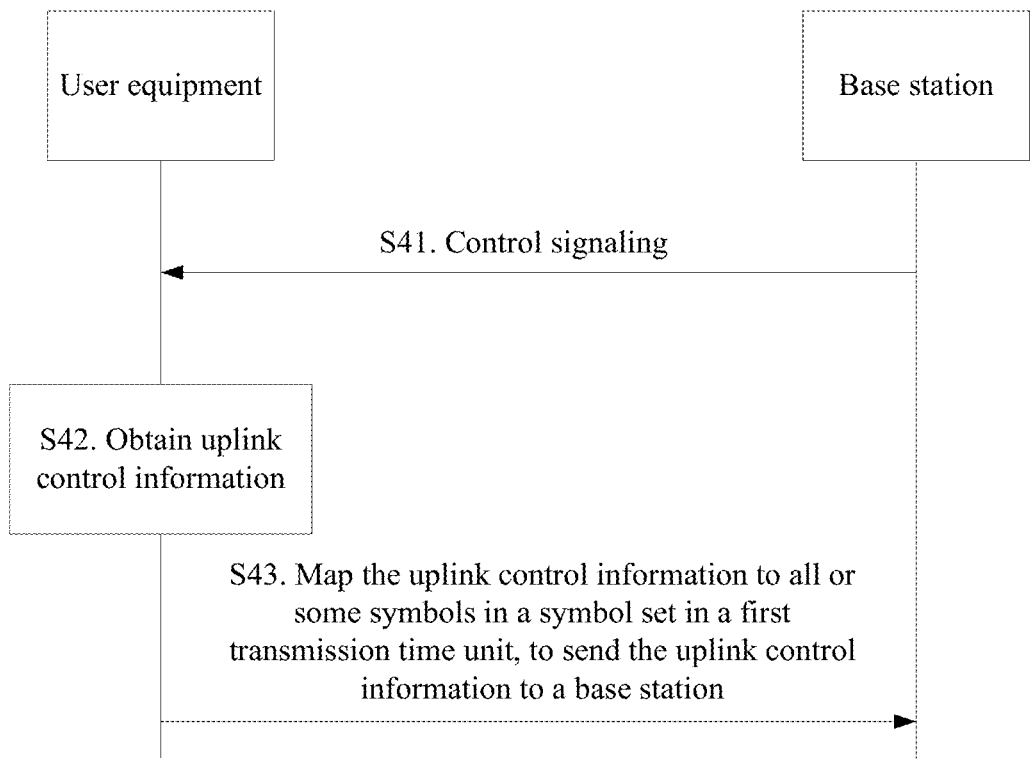
FIG. 4 is a flowchart of an uplink control information sending method according to an embodiment of the present application.

The user equipment may be configured to perform the foregoing method provided in the embodiment shown in FIG. 4, and may be, for example, the user equipment described above. Therefore, for functions implemented by the units in the user equipment and the like, reference may be made to descriptions in the method part, and details are not described again.

Figure 10:
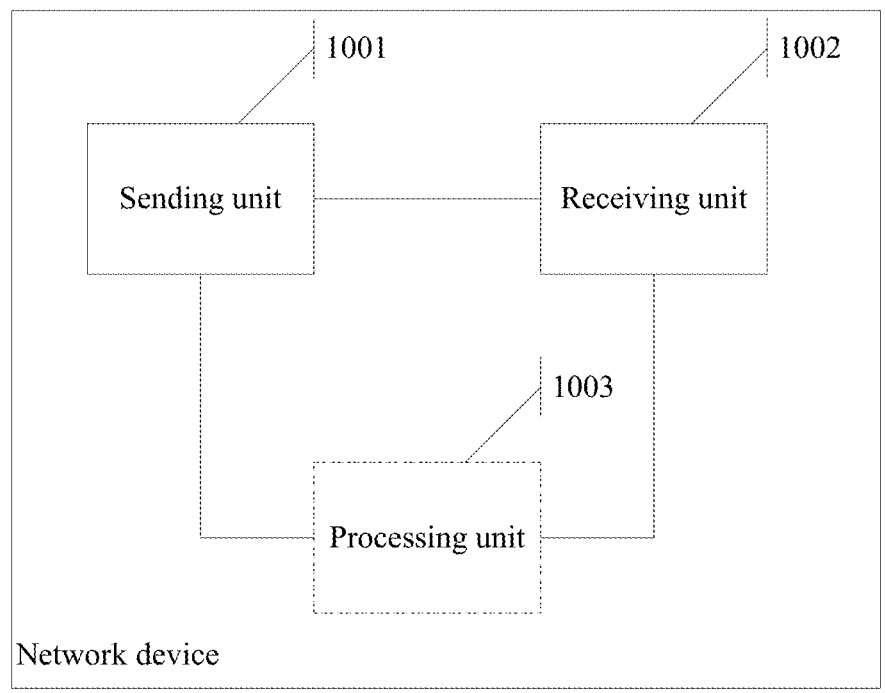
FIG. 10 is a schematic structural diagram of a network device according to an embodiment of the present application.

Referring to FIG. 10, an embodiment of the present application provides a network device, where the network device includes a sending unit 1001 and a receiving unit 1002. The sending unit 1001 is configured to send control signaling to user equipment. The receiving unit 1002 is configured to receive, according to an instruction of the control signaling and on all or some symbols in a symbol set included in a first transmission time unit, uplink control information sent by the user equipment.

Optionally, the network device may further include a processing unit 1003, configured to generate the control signaling. The processing unit 1003 is also shown in FIG. 10. Because the processing unit 1003 is an optional functional unit, the processing unit 1003 is drawn in dashed lines in FIG. 10, to distinguish from the mandatory functional units.

In actual application, a physical device corresponding to the sending unit 1001 and the receiving unit 1002 may be the communications interface 604 in FIG. 6, and a physical device corresponding to the processing unit 1003 may be the processor 601 in FIG. 6. It may be considered that, when the network device is implemented by using the computer device 600 shown in FIG. 6, in the communications interface 604 in FIG. 6, some communications interfaces 604 implement a function of the receiving unit 1002, and some communications interfaces 604 implement a function of the sending unit 1001; or it may be considered that, in the communications interface 604 in FIG. 6, all communications interfaces 604 or some communications interfaces 604 possibly can implement both a function of the receiving unit 1002 and a function of the sending unit 1001.

The network device may be configured to perform the foregoing method provided in the embodiment shown in FIG. 4, and may be, for example, the base station described above. Therefore, for functions implemented by the units in the network device and the like, reference may be made to descriptions in the method part, and details are not described again.

Figure 11:
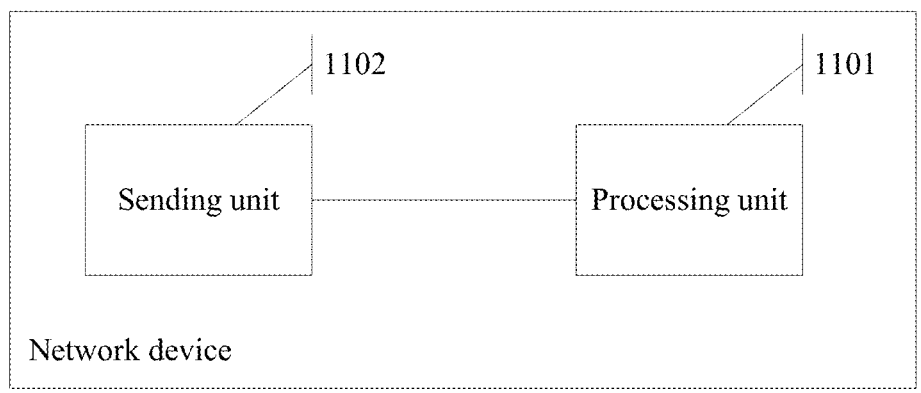
FIG. 11 is a schematic structural diagram of a network device according to an embodiment of the present application.

Referring to FIG. 11, an embodiment of the present application provides a network device, where the network device includes a processing unit 1101 and a sending unit 1102.

In actual application, a physical device corresponding to the sending unit 1102 may be the communications interface 604 in FIG. 6, and a physical device corresponding to the processing unit 1101 may be the processor 601 in FIG. 6. It may be considered that, when the network device is implemented by using the computer device 600 shown in FIG. 6, in the communications interface 604 in FIG. 6, some communications interfaces 604 implement a data receiving function, and some communications interfaces 604 implement a function of the sending unit 1102; or it may be considered that, in the communications interface 604 in FIG. 6, all communications interfaces 604 or some communications interfaces 604 possibly can implement both a data receiving function and a function of the sending unit 1102.

The network device may be configured to perform the foregoing method provided in the embodiment shown in FIG. 5, and may be, for example, the base station described above. Therefore, for functions implemented by the units in the network device and the like, reference may be made to descriptions in the method part, and details are not described again.

In the embodiments of the present application, the user equipment may map the uplink control information to the at least two transmission time units, to send the uplink control information. In this way, the uplink control information may occupy a relatively large quantity of symbols, coverage for a PUCCH is improved, and especially, when a relatively large amount of uplink control information needs to be transmitted, a situation in which the uplink control information fails to be transmitted due to a lack of resources can be effectively avoided.

In the present application, it should be understood that the disclosed device and method may be implemented in other manners. For example, the described apparatus embodiment is merely an example. For example, the unit division is merely logical function division and may be other division in actual implementation. For example, a plurality of units or components may be combined or may be integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form or other forms.

An embodiment of the present application further provides a computer storage medium, where the computer storage medium may store a program. During execution of the program, some or all steps of a bandwidth adjustment method in any video communication process disclosed in the foregoing method embodiments are included.

Functional units in the embodiments of the present application may be integrated into one processing unit, or the units may be independent physical modules.

If the integrated unit is implemented in a form of a software function unit and sold or used as an independent product, the integrated unit may be stored in a computer-readable storage medium. Based on such an understanding, all or a part of the technical solutions of the present application may be implemented in a form of a software product. The computer software product is stored in a storage medium and includes several instructions for instructing a computer device, such as a personal computer, a server, or a network device, or a processor (processor) to perform all or some of the steps of the methods described in the embodiments of the present application. The foregoing storage medium includes various media that can store program code, such as a Universal Serial Bus flash drive (Universal Serial Bus flash drive), a removable hard disk, a ROM, a RAM, a magnetic disk, or an optical disc.

The foregoing embodiments are merely used to describe the technical solutions of the present application in detail. The descriptions of the foregoing embodiments are merely intended to help understand the method in the embodiments of the present application, but shall not be construed as a limitation on the embodiments of the present application. Modification or replacement that can be easily figured out by a person skilled in the art shall fall within the protection scope of the embodiments of the present application.

What is claimed is:

1. A method, comprising:
receiving, by user equipment, first downlink data in a first subframe, wherein the first subframe is a self-contained subframe comprising resources allocated for uplink transmission and resources allocated for downlink transmission, and the first downlink data is received using the resources allocated for downlink transmission;

in response to receiving the first downlink data, obtaining, by the user equipment, uplink control information corresponding to the first downlink data;

dividing, by the user equipment, the uplink control information corresponding to the first downlink data into partial uplink control information and remaining uplink control information;

determining, by the user equipment, a frequency offset between first frequency resources to be used to transmit the partial uplink control information in the resources allocated for uplink transmission in the first subframe and second frequency resources to be used to transmit the remaining uplink control information in a second subframe, wherein control signaling received by the user equipment carries the frequency offset;

mapping, by the user equipment, the partial uplink control information to time domain resources and the first frequency resources of the first subframe, and mapping the remaining uplink control information to time domain resources and the second frequency resources of the second subframe, according to the determined frequency offset; and sending the partial uplink control information and the remaining uplink control information to a network device using the first subframe and the second subframe.

2. The method according to claim 1, wherein mapping, by the user equipment, the partial uplink control information to the time domain resources and the first frequency resources of the first subframe and mapping the remaining uplink control information to the time domain resources and the second frequency resources of the second subframe comprises:

mapping, by the user equipment, the partial uplink control information to last M symbols and the first frequency resources in the first subframe; and mapping the remaining uplink control information to first N symbols and the second frequency resources in the second subframe, wherein the first subframe and the second subframe are contiguous subframes, and both M and N are positive integers.

3. The method according to claim 2, further comprising:
receiving, by the user equipment, the control signaling sent by the network device, and determining a frequency domain position of the first frequency resources to be used to transmit the partial uplink control information in the first subframe based on the control signaling.

4. The method according to claim 2, wherein:
the second frequency resources to be used to transmit the remaining uplink control information in the second subframe comprises P contiguous subcarriers, wherein P is a positive integer; and
the P subcarriers comprise: a subcarrier that has a smallest number and that is in an uplink time-frequency resource allocated to the user equipment in the second subframe.

5. The method according to claim 2, further comprising:
determining, by the user equipment, downlink control information corresponding to the received first downlink data, and obtaining a frequency domain position of the first frequency resources to be used to transmit the partial uplink control information in the first subframe through calculation based on a number of a first control channel element of the downlink control information.

6. The method according to claim 2, wherein:
a frequency domain position occupied by the second frequency resources to be used to transmit the remaining uplink control information in the second subframe comprises P contiguous subcarriers, wherein P is a positive integer; and
the P subcarriers comprise: a subcarrier that has a largest number and that is in an uplink time-frequency resource allocated to the user equipment in the second subframe.

7. The method according to claim 1, wherein the second subframe is a dedicated subframe and all resources of the second subframe are allocated for uplink transmission.

8. The method according to claim 1, wherein the uplink control information comprises an acknowledgment (ACK)/negative acknowledgment (NACK) corresponding to the first downlink data.

9. User equipment, comprising:
a processor; and
a non-transitory computer-readable storage medium storing a program to be executed by the processor, the program including instructions for:
receiving first downlink data in a first subframe, wherein the first subframe is a self-contained subframe comprising resources allocated for uplink transmission and resources allocated for downlink transmission, and the first downlink data is received using the resources allocated for downlink transmission;
in response to receiving the first downlink data, obtaining uplink control information corresponding to the first downlink data;
dividing the uplink control information corresponding to the first downlink data into partial uplink control information and remaining uplink control information;
determining according to control signaling received by the user equipment, a frequency offset between first frequency resources to be used to transmit the partial uplink control information in the resources allocated for uplink transmission in the first subframe and second frequency resources to be used to transmit the remaining uplink control information in a second subframe, wherein the control signaling carries the frequency offset;
mapping the partial uplink control information to time domain resources and the first frequency resources in the first subframe, and mapping the remaining uplink control information to time domain resources and the second frequency resources in the second subframe, according to the determined frequency offset; and
sending the partial uplink control information and the remaining uplink control information to a network device using the first subframe and the second subframe.

10. The user equipment according to claim 9, wherein the instructions for mapping the partial uplink control information to the time domain resources and the first frequency resources in the first subframe, and mapping the remaining uplink control information to the time domain resources and the second frequency resources in the second subframe, comprise instructions for:
mapping the partial uplink control information to last M symbols and the first frequency resources in the first subframe; and
mapping the remaining uplink control information to first N symbols and the second frequency resources in the second subframe, wherein the first subframe and the second subframe are contiguous subframes, and both M and N are positive integers.

11. The user equipment according to claim 10, wherein the user equipment further comprises a receiver, configured to:
receive the control signaling sent by the network device; and
wherein the program further includes instructions for:
determining a frequency domain position of the first frequency resources to be used to transmit the partial uplink control information in the first subframe based on the control signaling; or
determining downlink control information corresponding to received downlink data, and obtaining a frequency domain position of the first frequency resources to be used to transmit the partial uplink control information in the first subframe through calculation based on a number of a first control channel element of the downlink control information.

12. The user equipment according to claim 10, wherein:
a frequency domain position occupied by the second frequency resources to be used to transmit the remaining uplink control information in the second subframe comprises P contiguous subcarriers, wherein P is a positive integer; and
wherein the P subcarriers comprise:
a subcarrier that has a smallest number and that is in an uplink time-frequency resource allocated to the user equipment in the second subframe; or
a subcarrier that has a largest number and that is in an uplink time-frequency resource allocated to the user equipment in the second subframe.

* * * * *